(12) United States Patent
Giamati

(10) Patent No.: US 8,857,768 B2
(45) Date of Patent: Oct. 14, 2014

(54) DRAINMAST

(75) Inventor: Michael John Giamati, Akron, OH (US)

(73) Assignee: Goodrich Corporation, Charlotte, OH (US)

( * ) Notice: Subject to any disclaimer, the term of this patent is extended or adjusted under 35 U.S.C. 154(b) by 64 days.

(21) Appl. No.: 13/468,974

(22) Filed: May 10, 2012

(65) Prior Publication Data

US 2012/0286095 A1 Nov. 15, 2012

Related U.S. Application Data

(60) Provisional application No. 61/485,674, filed on May 13, 2011.

(51) Int. Cl.
*B64C 1/14* (2006.01)
(52) U.S. Cl.
CPC ..................................... *B64C 1/1453* (2013.01)
USPC ......................................................... 244/136
(58) Field of Classification Search
USPC .............. 244/136, 118.5, 130, 134 D, 134 B; 73/861.68; 239/171
See application file for complete search history.

(56) References Cited

U.S. PATENT DOCUMENTS

| 3,535,930 | A |  | 10/1970 | Rees |
|---|---|---|---|---|
| 4,354,648 | A | * | 10/1982 | Schenk et al. ............. 244/200.1 |
| 5,290,996 | A |  | 3/1994 | Giamati et al. |
| 5,552,576 | A |  | 9/1996 | Giamati |
| 5,655,732 | A |  | 8/1997 | Frank |
| 6,211,494 | B1 |  | 4/2001 | Giamati et al. |
| 6,425,554 | B1 |  | 7/2002 | Moreland |
| 6,435,452 | B1 |  | 8/2002 | Jones |
| 7,546,981 | B2 |  | 6/2009 | Hoffjann et al. |
| 7,651,055 | B2 |  | 1/2010 | Turner et al. |
| 7,731,127 | B2 |  | 6/2010 | Hoffjann et al. |
| 2002/0079405 | A1 | * | 6/2002 | Layukallo ...................... 244/130 |
| 2005/0230547 | A1 |  | 10/2005 | Giamati et al. |
| 2006/0249628 | A1 | * | 11/2006 | Turner et al. .................. 244/136 |
| 2011/0121137 | A1 |  | 5/2011 | Sandiford |

* cited by examiner

*Primary Examiner* — Timothy D Collins
*Assistant Examiner* — Jessica Wong
(74) *Attorney, Agent, or Firm* — Cantor Colburn LLP

(57) ABSTRACT

A drainmast which releases water into an airstream traveling in a fore-aft direction includes a water-discharging exit on its underside for communicating with the airstream, a post-exit stage on its underside situated aft of the water-discharging exit, where the water-discharging exit is vertically offset downward from the post-exit stage. The drainmast also includes a fairing having a mounting flange and a mast projecting downward from the mounting flange, the mast having a main body with a window and a door fastened to the main body to close the window.

18 Claims, 24 Drawing Sheets

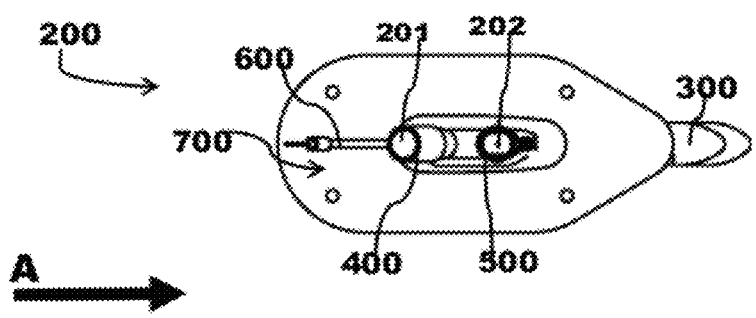
FIGURE 2C
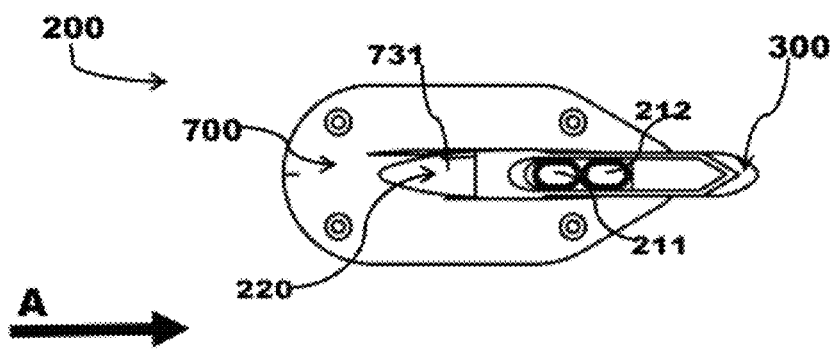
FIGURE 2D
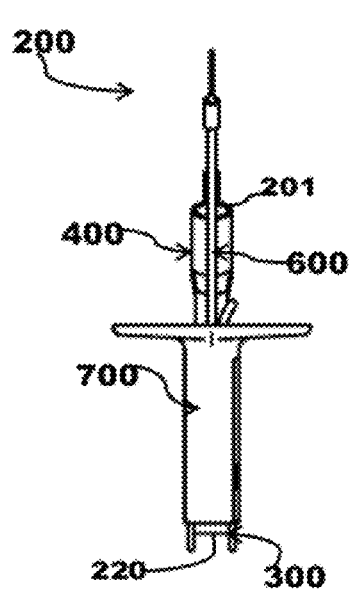 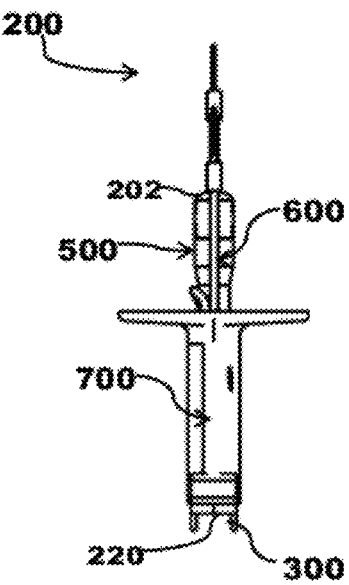
FIGURE 2E FIGURE 2F

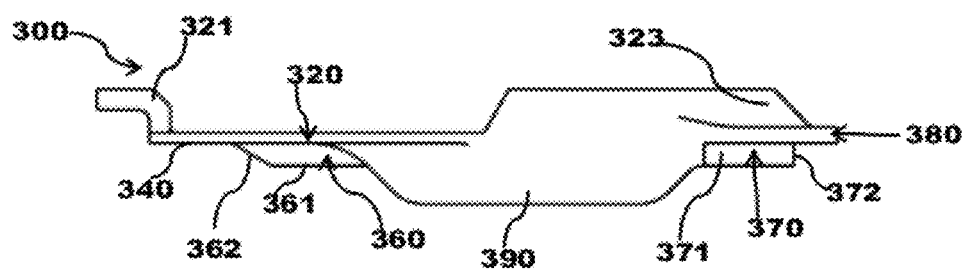
FIGURE 3A
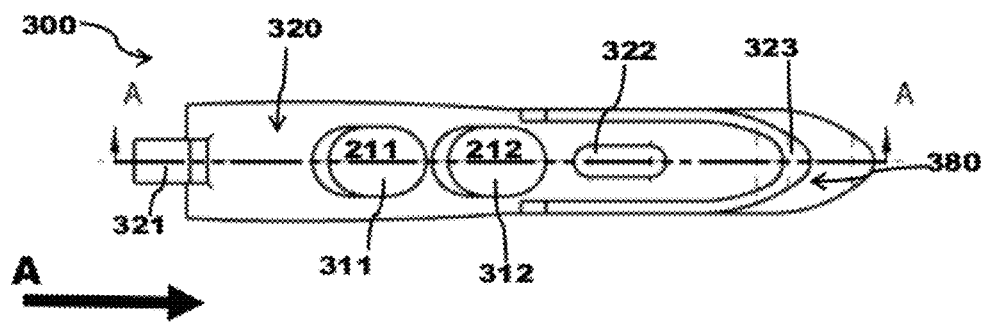
FIGURE 3B
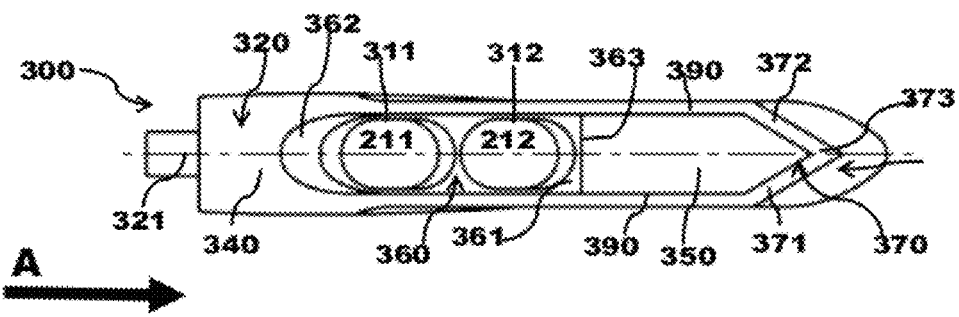
FIGURE 3C
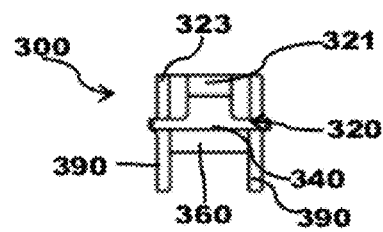 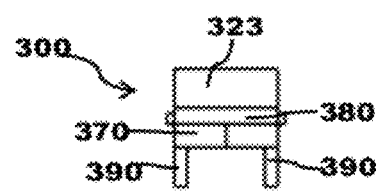
FIGURE 3D  FIGURE 3E

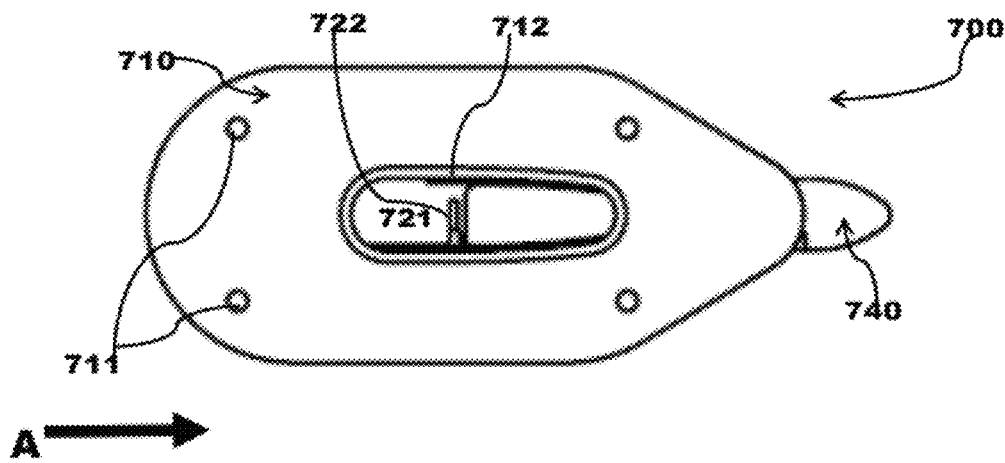
FIGURE 7C
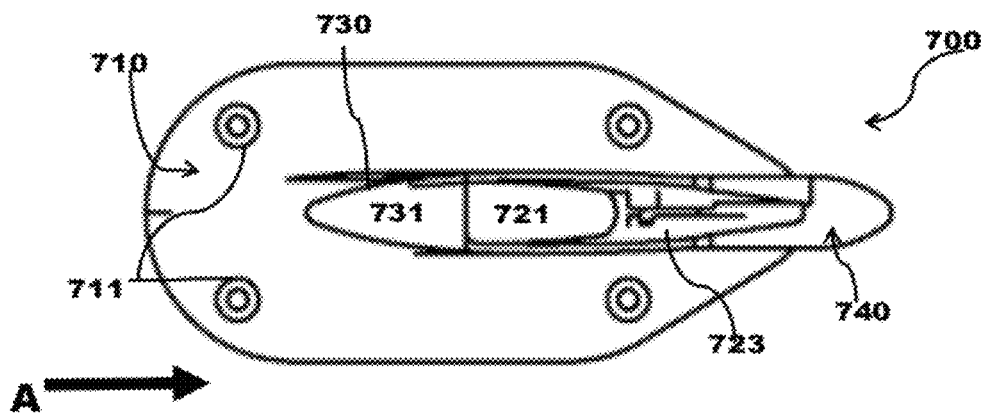
FIGURE 7D
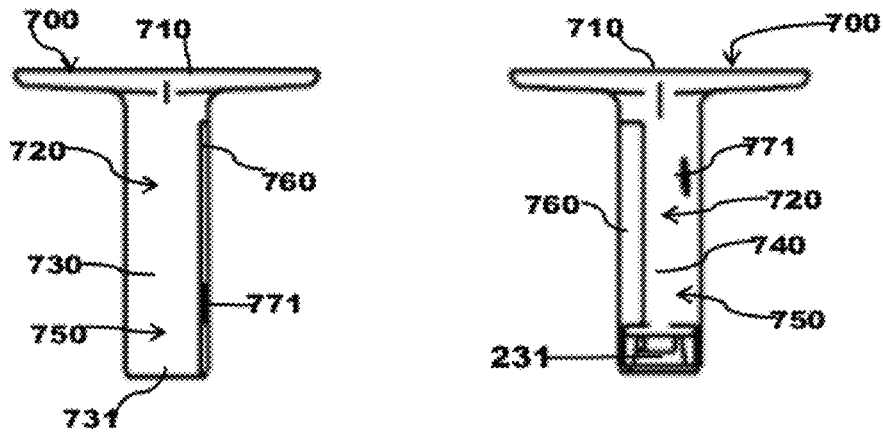
FIGURE 7E  FIGURE 7F

DRAINMAST

RELATED APPLICATION

This application claims priority under 35 USC 119(e) to U.S. Provisional Patent Application No. 61/485,674 filed on May 13, 2011. The entire disclosure of this provisional patent application is hereby incorporated by reference.

BACKGROUND

A drainmast can be installed on an aircraft to discharge water into the ensuing airstream. A drainmast can comprise a water-discharging exit communicating with the airstream, a draintube defining a water entrance into the drainmast, a heater for heating the draintube (to prevent water from freezing therein) and a fairing encircling internal regions of the draintube and the heater. If the drainmast also includes an exit-defining foot, it must usually also be heated to avoid ice from accumulating thereon.

SUMMARY

A drainmast design is provided with water-steering features that effectively and efficiently discharge water into the airstream. If the drainmast includes an exit-defining foot, some or all of these features can be incorporated thereinto. The water-steering features allow a drainmast and/or foot construction with smaller size, lighter weight, lower heating-power requirements, and/or decreased drag.

DRAWINGS

FIGS. 3A-3G show various views of a foot 300 of the drainmast and FIGS. 3H-3K show various views of the foot with a pedestal installed therein.

FIGS. 4A-4F show various views of a fore draintube 400 mounted on the foot.

FIGS. 5A-5F show various views of an aft draintube 500 mounted on the foot and FIGS. 5G-5L show various views of both draintubes mounted to the foot.

FIGS. 6A-6F show various views of a heater 600 and FIG. 6G-6I show various views of the heater assembled with the foot and the draintubes.

DESCRIPTION

Figure 1:
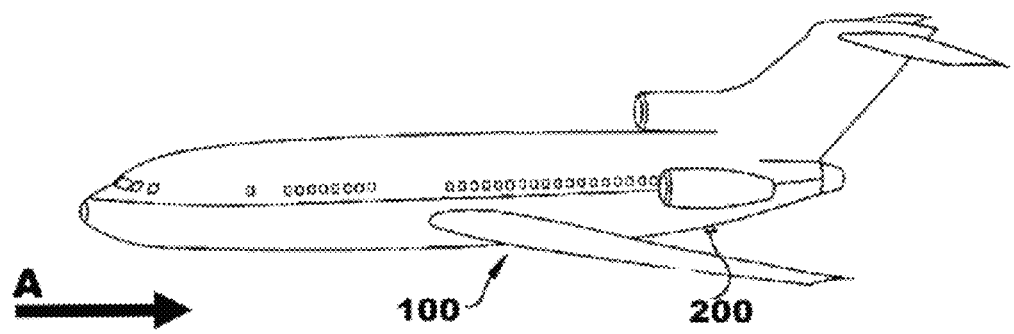
FIG. 1 shows an aircraft 100 with a drainmast 200 installed thereon.

Referring now to the drawings, and initially to FIG. 1, an aircraft 100 is shown with a drainmast 200 installed thereon. The drainmast 200 is designed to discharge liquid into airstream A traveling in a fore-to-aft direction. The liquid can comprise, for example, potable water and/or gray water from the aircraft's plumbing system.

As shown in FIGS. 2A-2G, the drainmast 200 has drain water entrances 201-202 and drain water exits 211-212. When the drainmast 200 is installed on the aircraft 100, the entrances 201-202 are connected to its internal drain lines. For example, the fore entrance 201 can be connected to a potable water drain line and the aft entrance 202 can be connected to a gray water drain line. The exits 211-212 are located on an underside 220 of the drainmast 200 and they communicate with the airstream A.

The illustrated drainmast 200 comprises a foot 300, a draintube 400, another draintube 500, a heater 600, and a fairing 700. The foot 300 defines the exits 211-212 and the draintubes 400 and 500 define the entrances 201-202. The heater 600 heats the draintubes 400 and 500 to prevent water from freezing therein, and also heats the foot 300 to prevent ice from accumulating thereon. The fairing encircles internal regions of the draintube 400, the draintube 500, and the heater 600.

Fluid-steering features are provided on the drainmast underside 220 to efficiently and effectively introduce exiting drain water into the airstream A. While the illustrated drainmast 200 includes two exits 211 and 212, this need not be the case. The fluid-steering and other features of the drainmast 200 can be used in the same or similar manner with single-exit and/or more-exits drainmast designs.

Figure 2A:
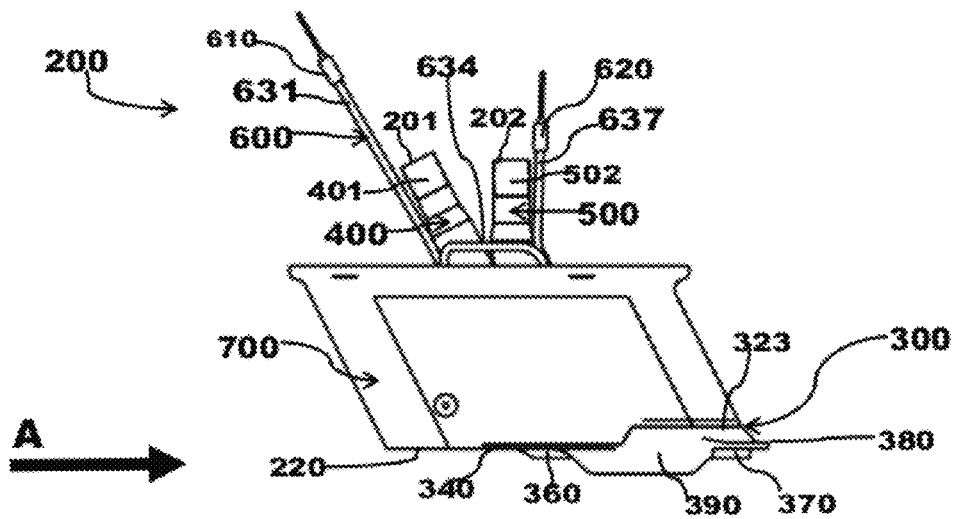
FIGS. 2A-2H show various views of the drainmast 200, and FIGS. 2I-2W schematically show the drainmast's water-steering features.
Figure 2B:
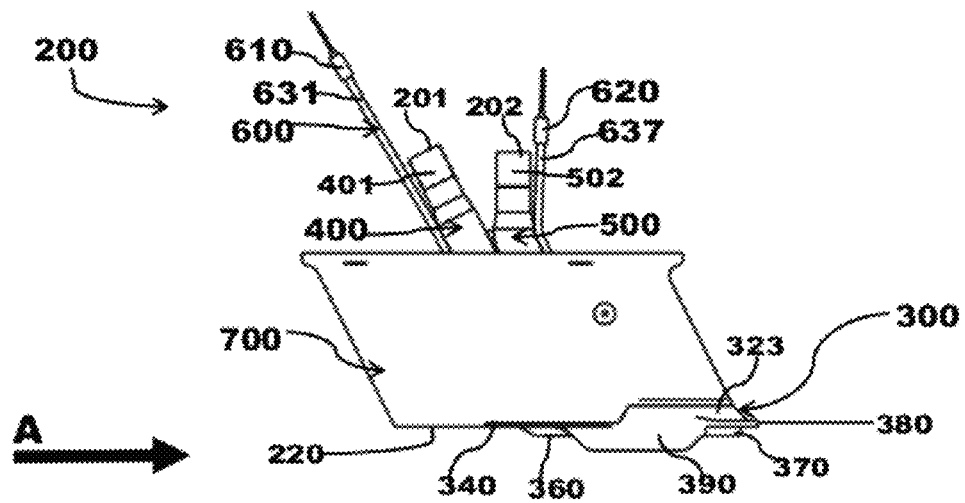
Figure 2G:
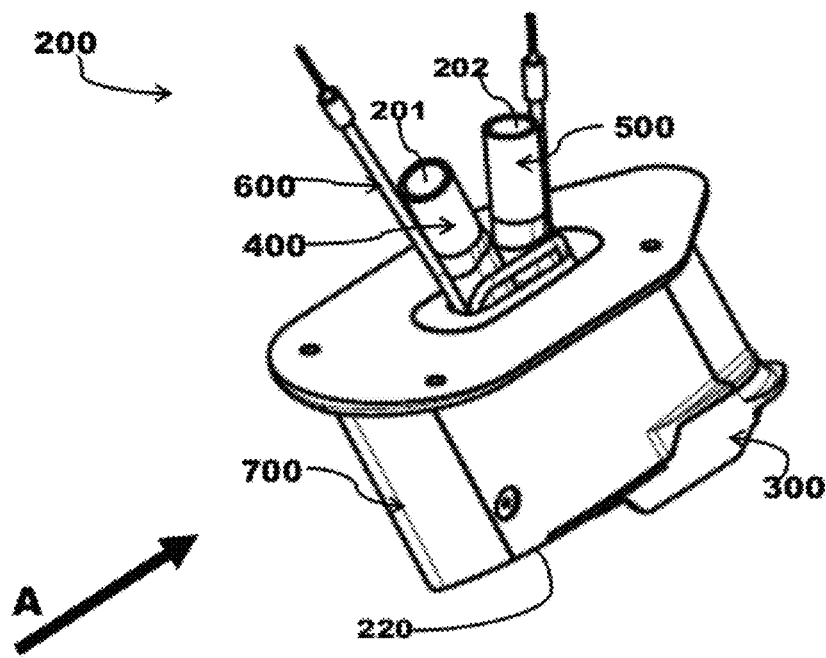
Figure 2H:
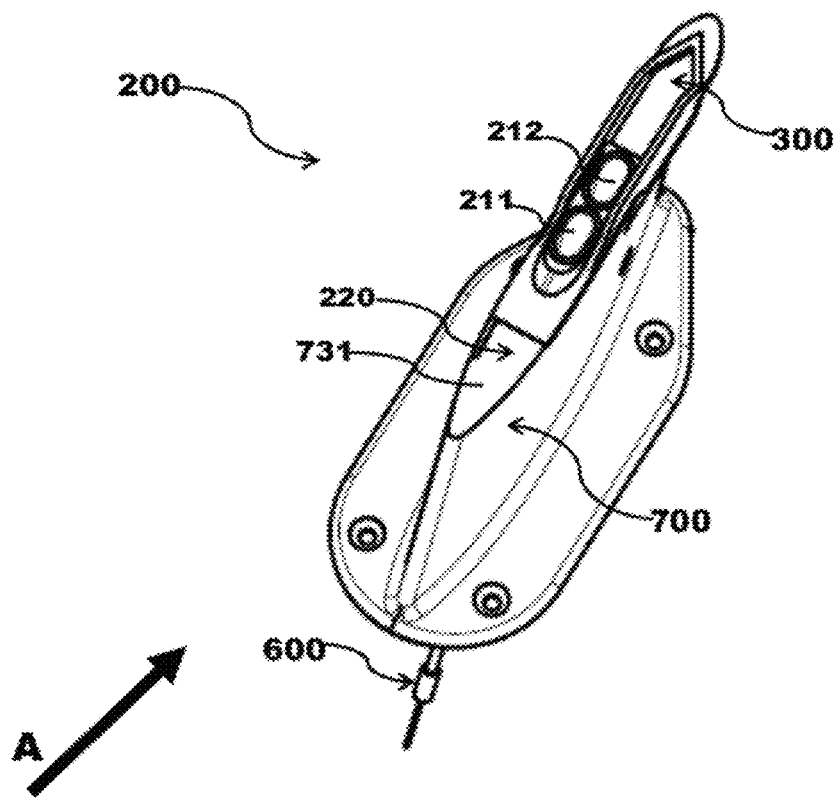
Figure 2I:
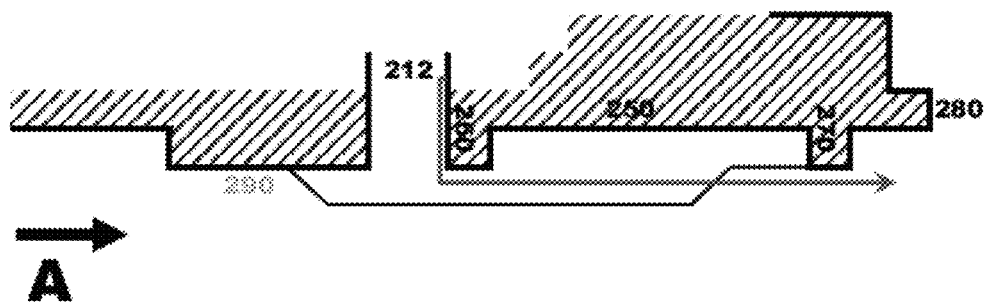
Figure 2J:
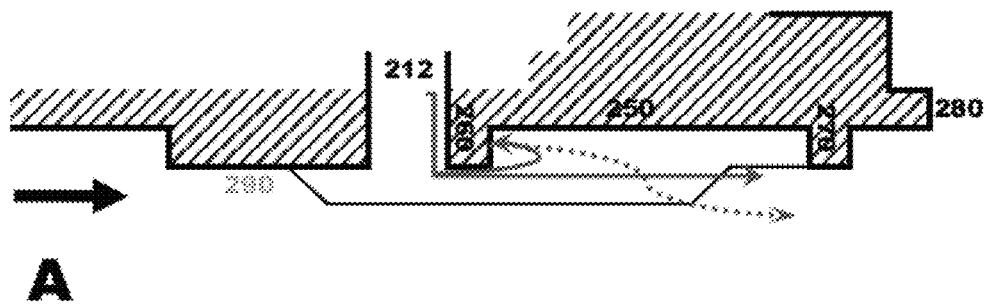
Figure 2K:
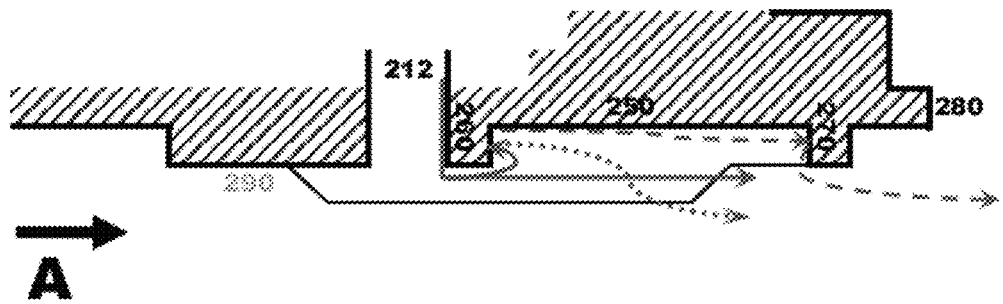
Figure 2L:
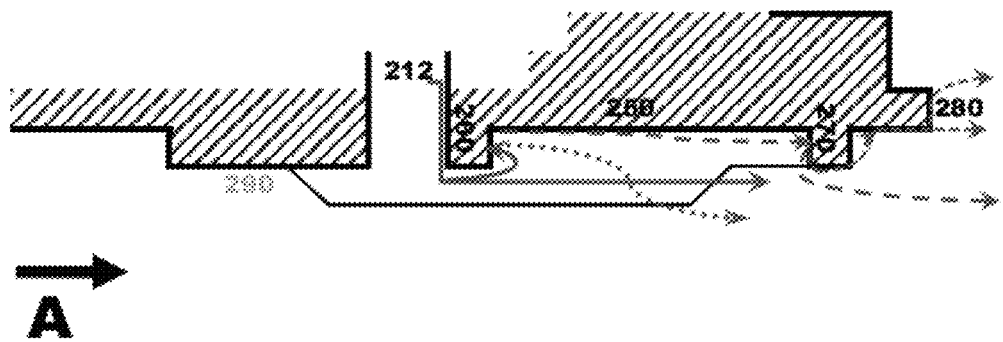
Figure 2M:
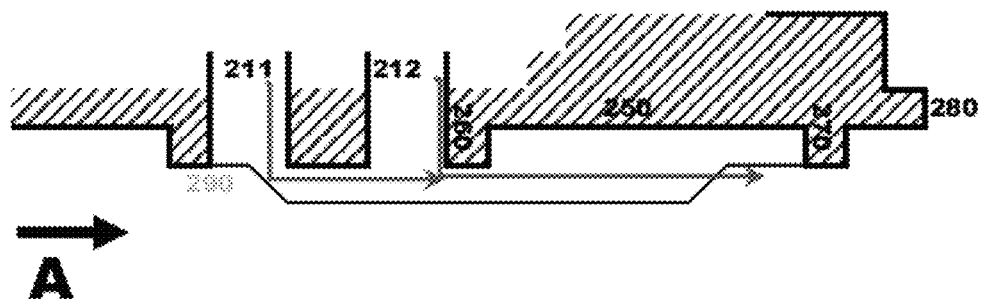
Figure 2N:
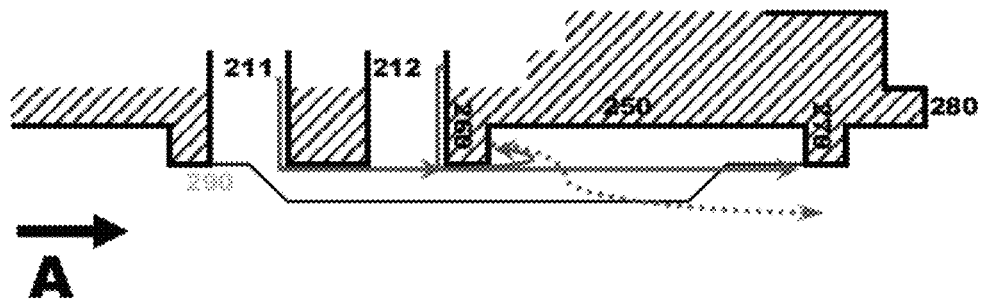
Figure 2O:
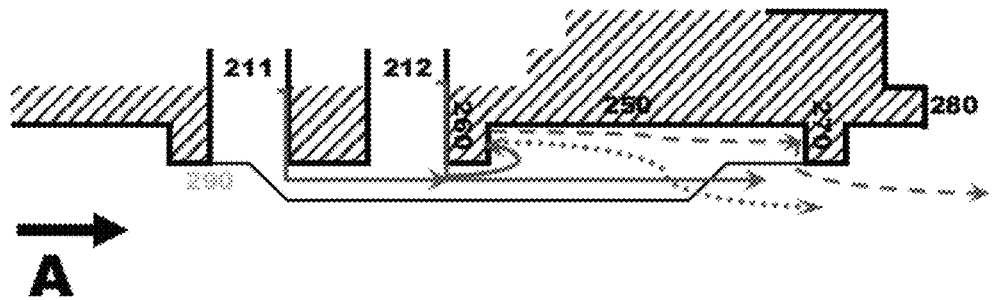
Figure 2P:
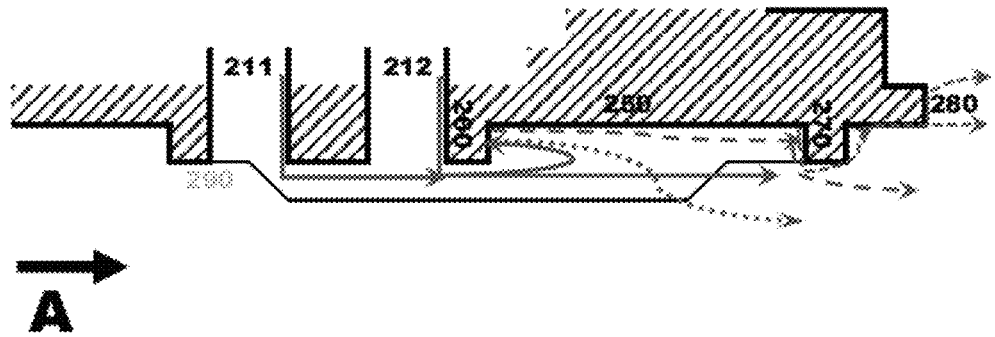
Figure 2Q:
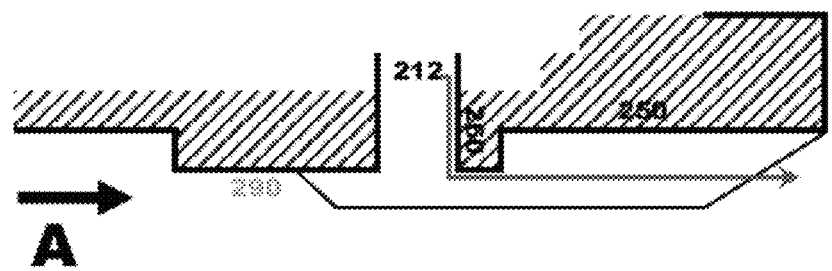
Figure 2R:
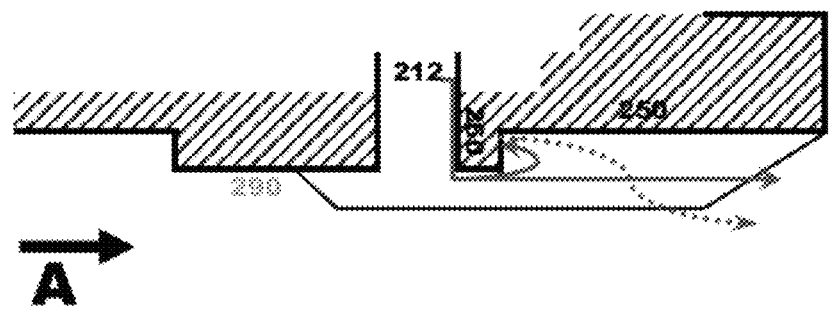
Figure 2S:
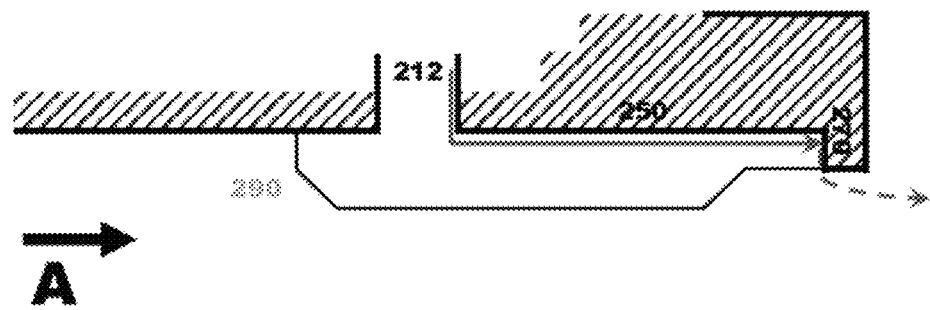
Figure 2T:
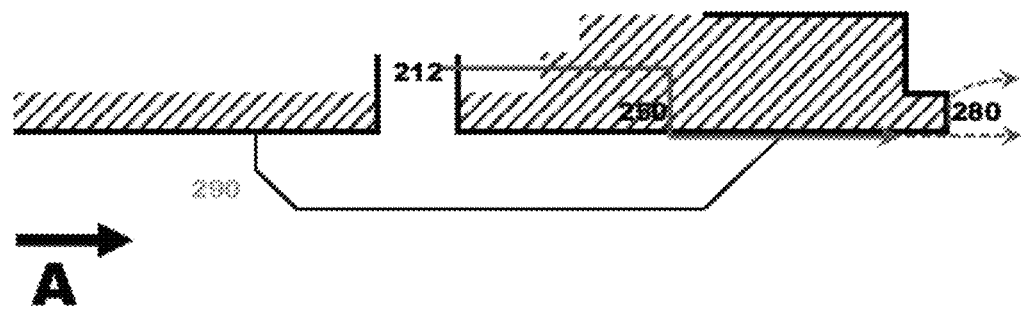
Figure 2U:
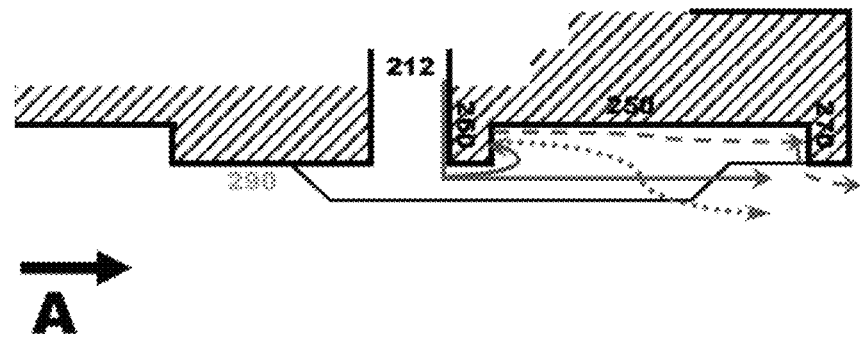
Figure 2V:
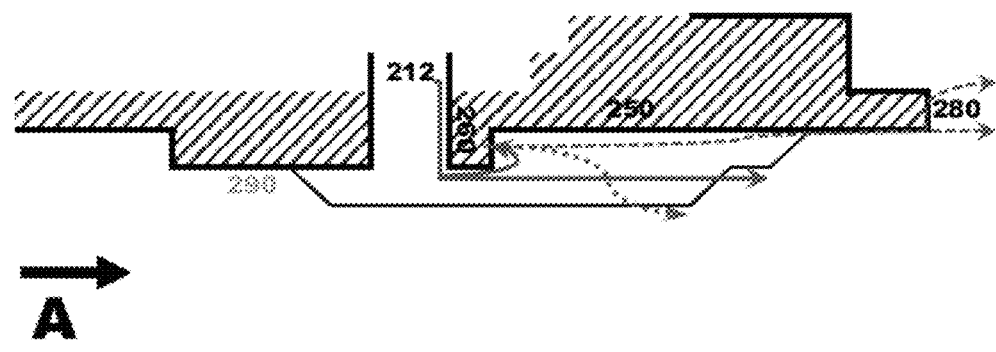
Figure 2W:
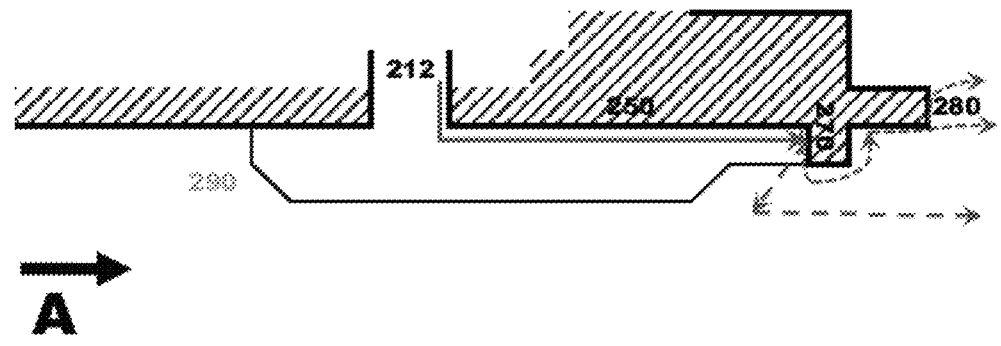
Figure 3F:
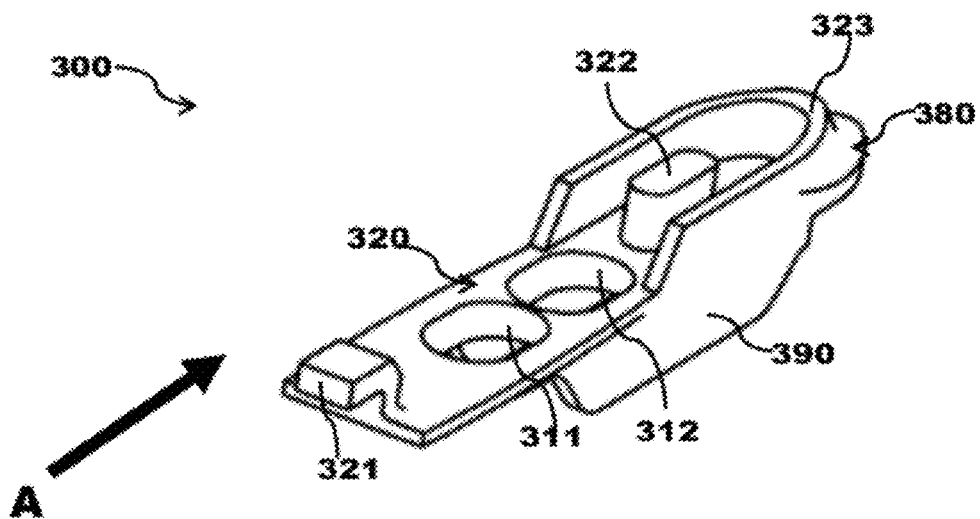
Figure 3G:
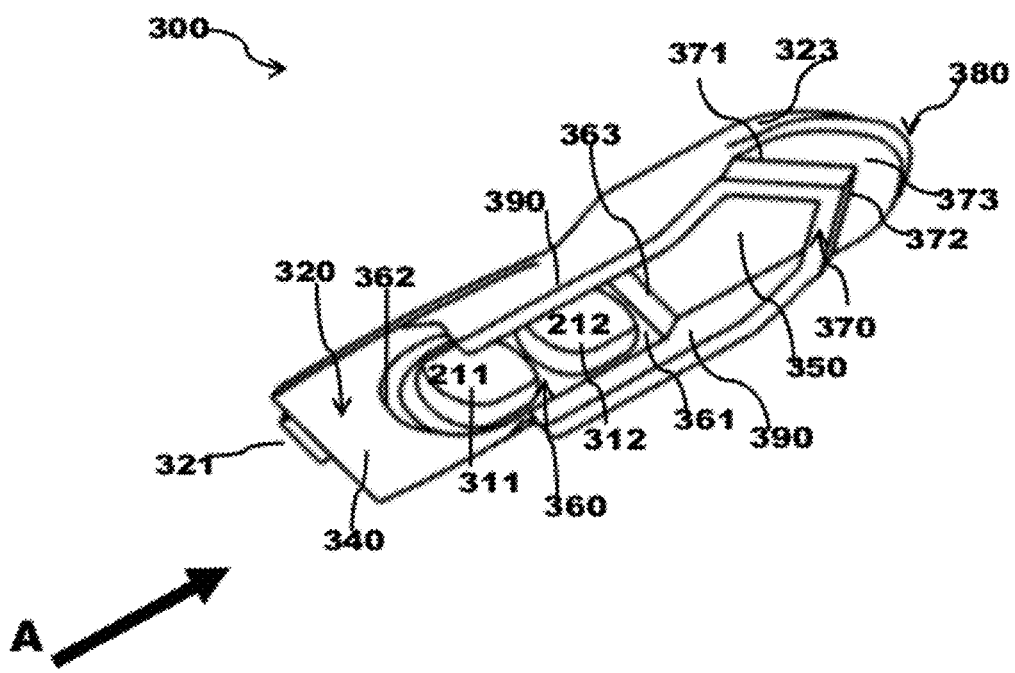
Figure 3H:
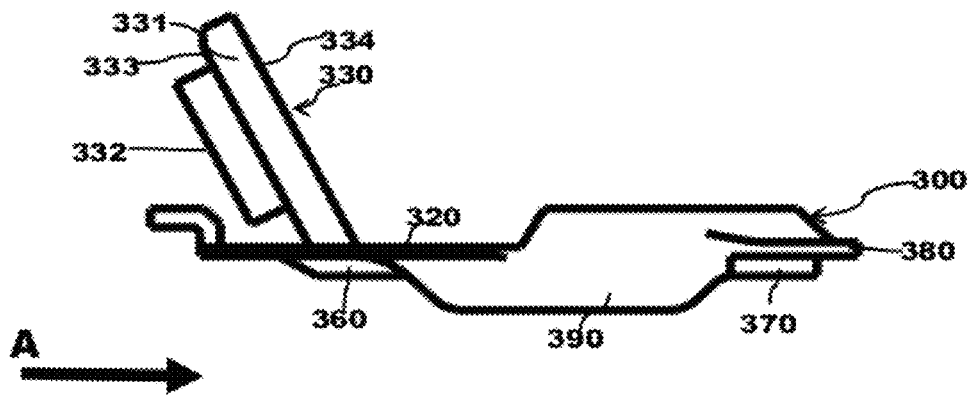
Figure 3I:
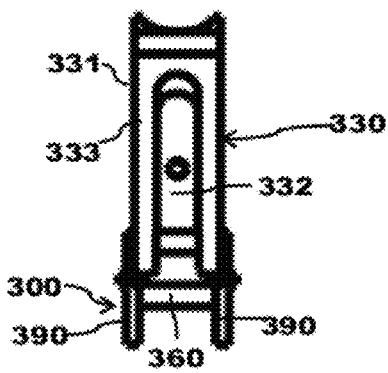
Figure 3J:
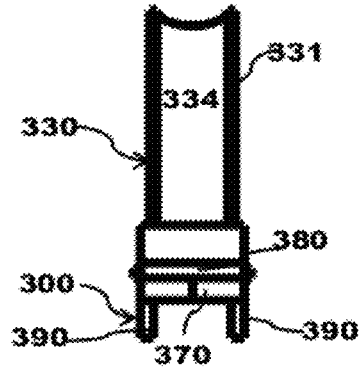
Figure 3K:
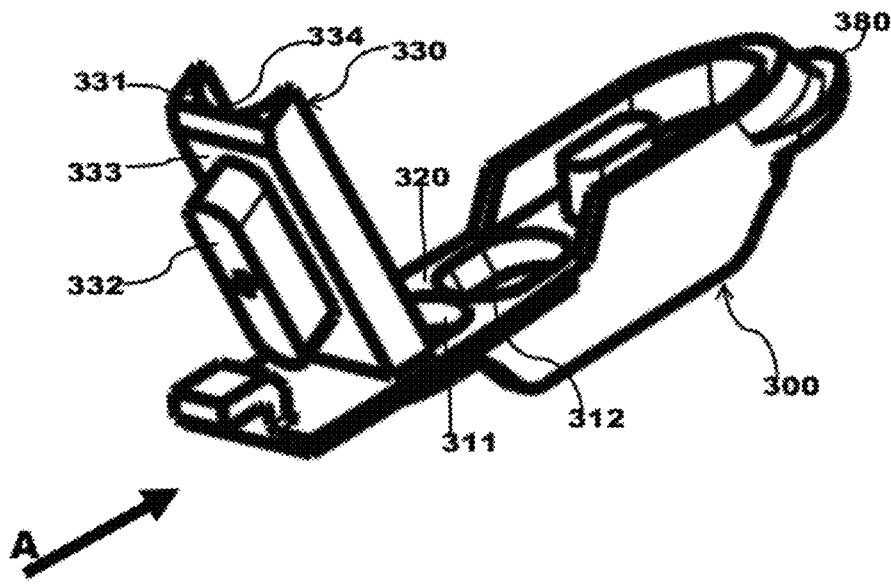
Figure 4A:
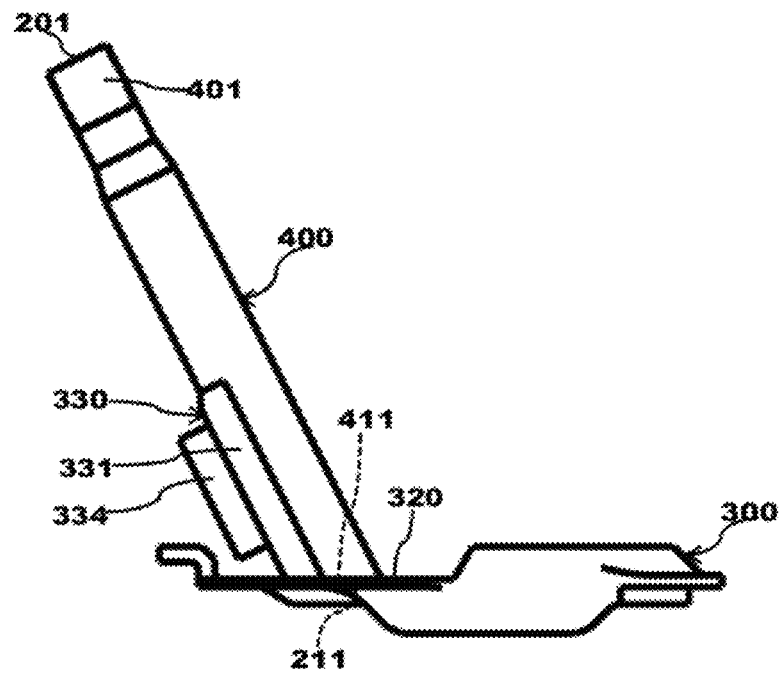
Figure 4C:
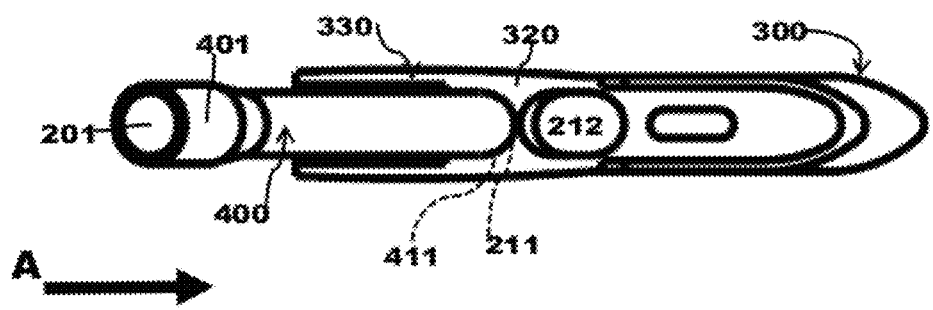
Figure 4C:
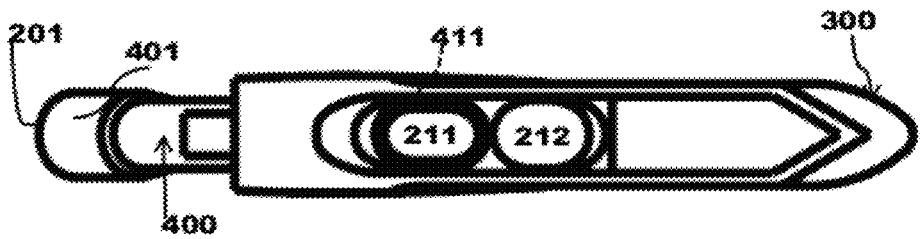
Figure 4F:
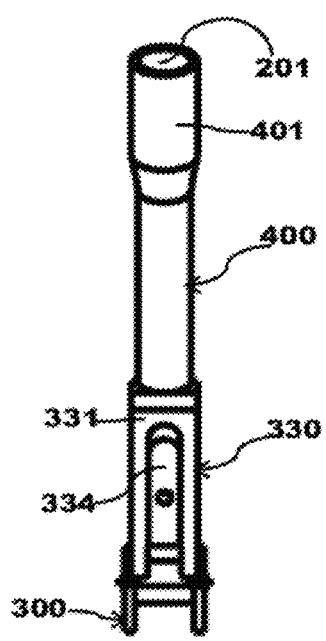
Figure 4F:
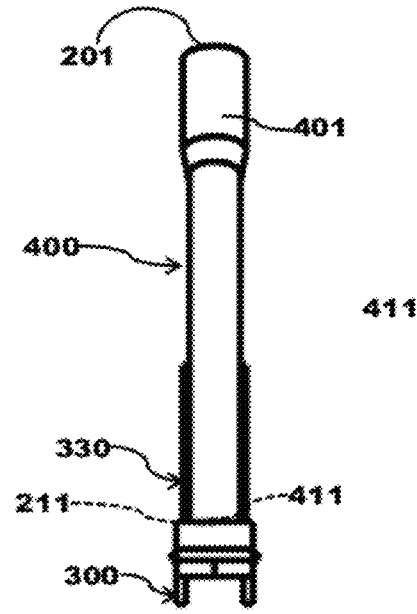
Figure 4F:
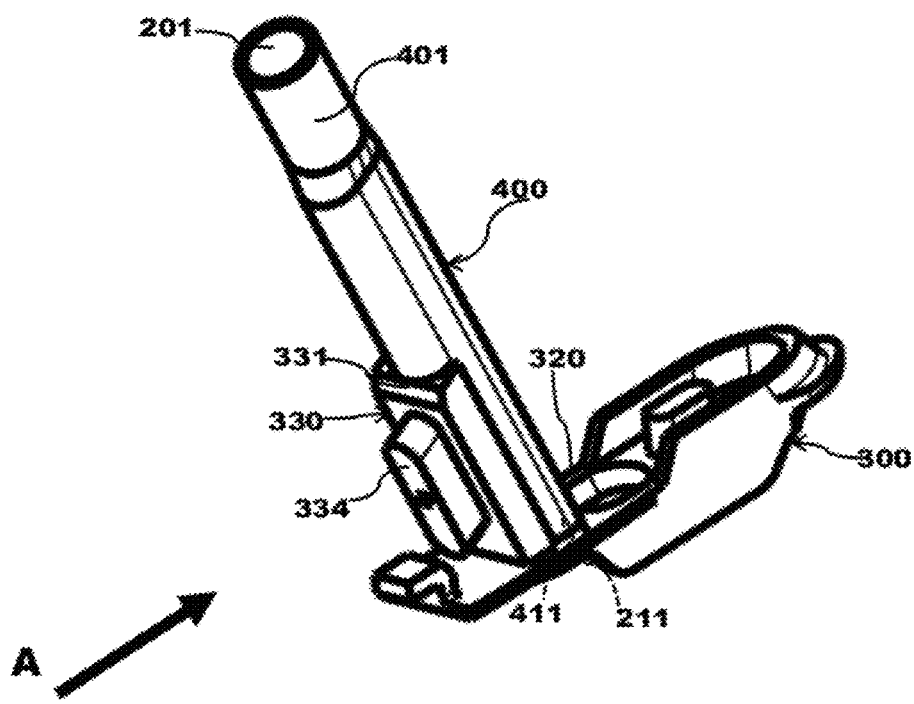
Figure 5A:
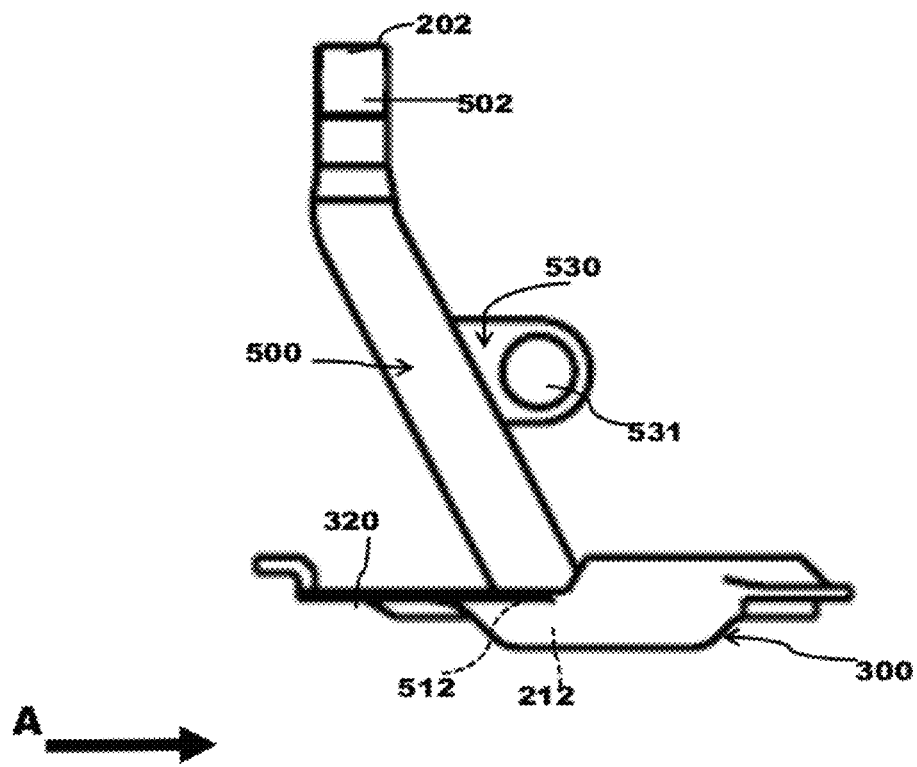
Figure 5B:
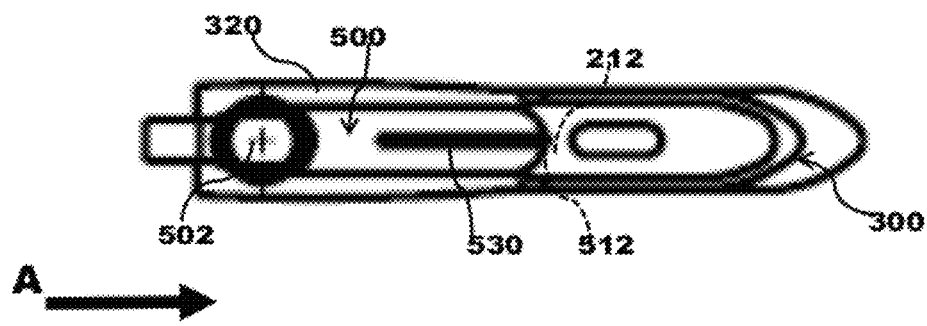
Figure 5C:
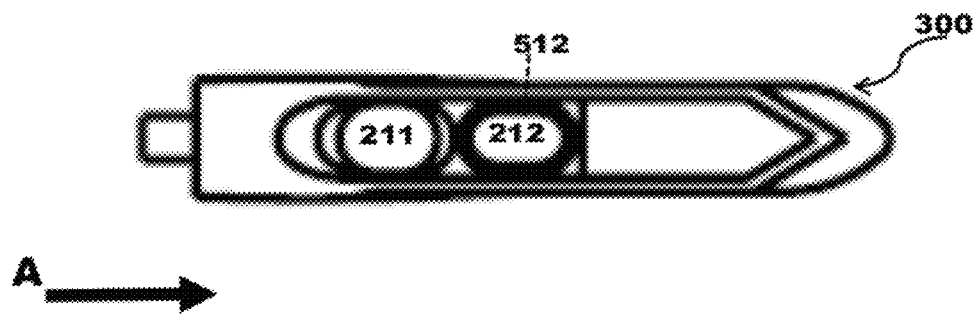
Figure 5F:
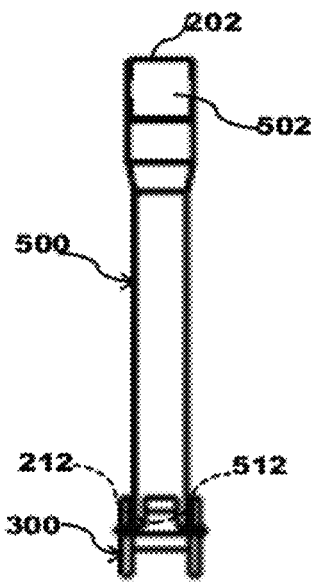
Figure 5F:
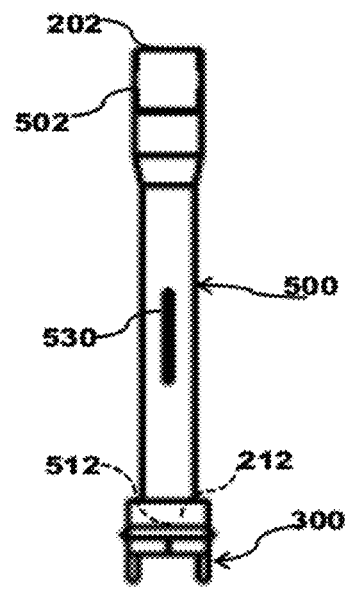
Figure 5F:
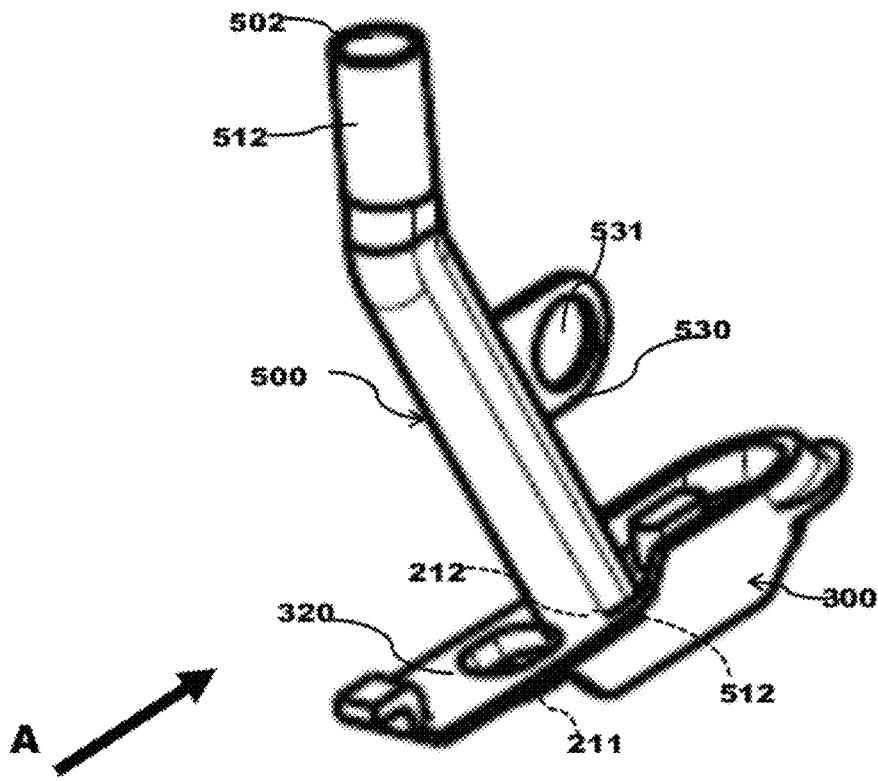
Figure 5G:
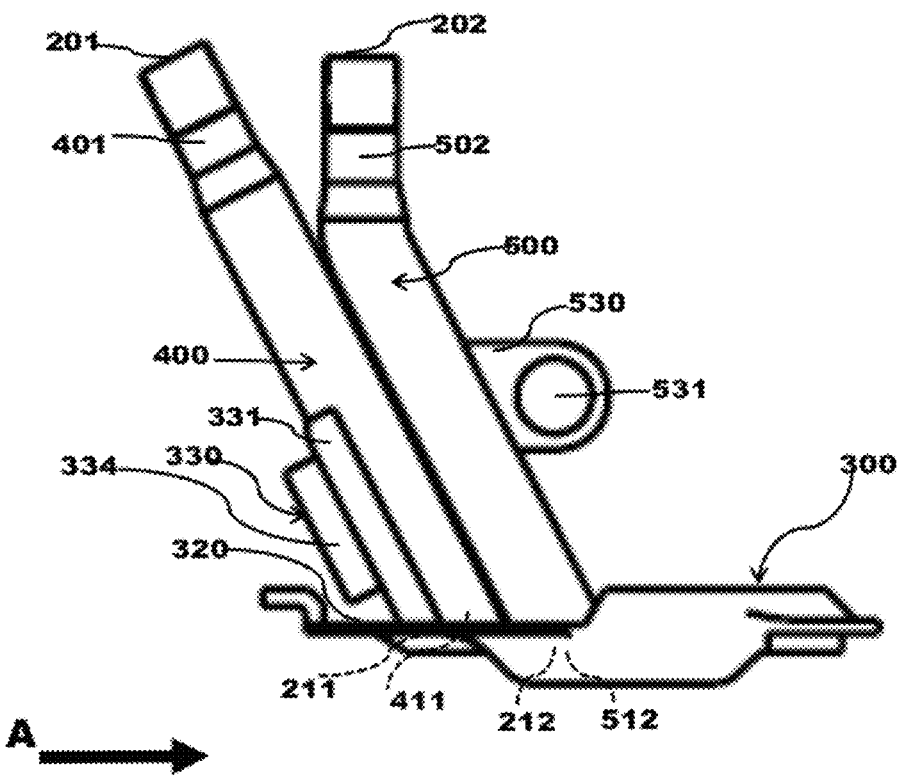
Figure 5H:
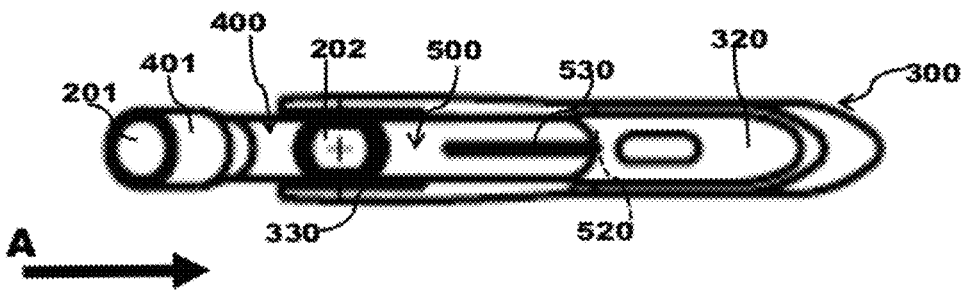
Figure 5I:
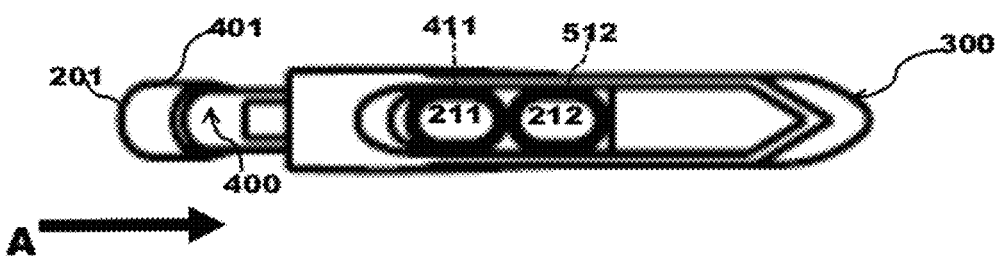
Figure 5J:
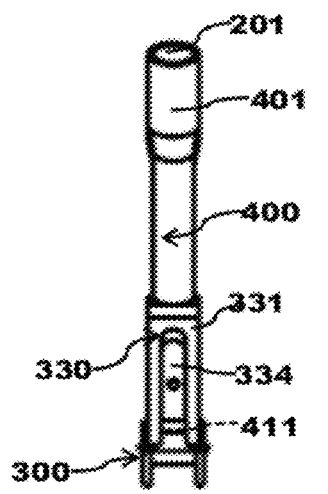
Figure 5K:
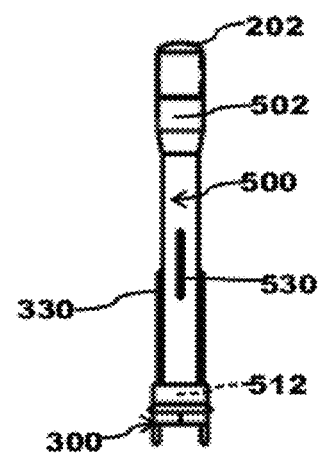
Figure 5L:
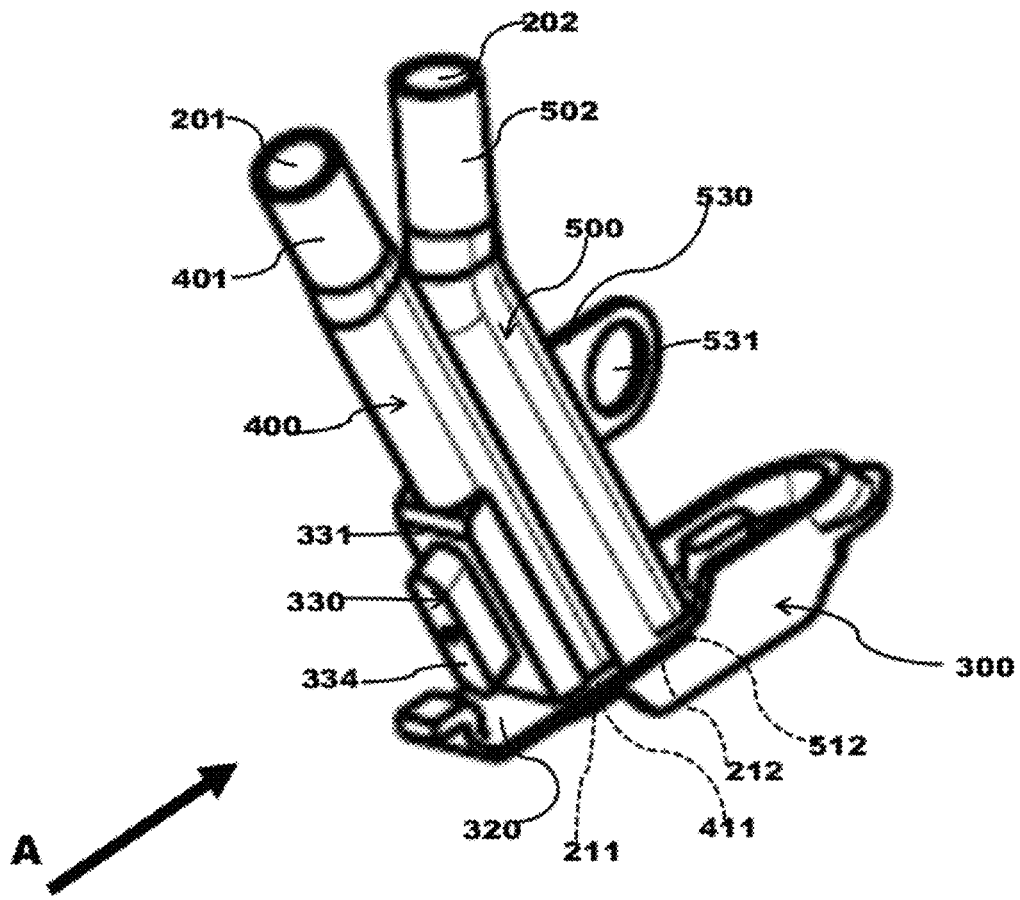

As shown schematically in FIGS. 2I-2W, the fluid-steering features can include a post-exit stage 250, a water-spraying step 260, a water-kicking barrier 270, and a water-escorting plank 280. The stage 250 is situated aft of the exit area and vertically offset upward therefrom by the water-spraying step 260. The water-kicking barrier 270 extends downward from the stage's aft end and the water-escorting plank 280 is cantilevered therefrom. Side rails 290 may extend downward from the lateral edges of the stage 250.

Referring first to FIGS. 2I-2L (wherein only one exit 212 is shown), drain water leaving the exit 212 is positioned downward of the stage 250. Assuming the airstream A has a vector substantially parallel with the stage level, the drain water is swept in a path below the stage 250 beyond the drainmast, as it passes over or off of the fore and aft corners of step 260. (FIG. 2I.)

Should some water creep upwards and engage the stage 250, it quickly contacts the step 260. The step-contacting water will migrate to the step's aft corner and will be carried off by the airstream A. (FIG. 2J.)

If some stage-engaging water is not removed, this residual water is funneled downstream on the stage 250 and hits the barrier 270. The barrier 270 kicks the water outward from the stage 250 so that it can be swept away by the airstream A. (FIG. 2K.) While the barrier 270 can have a straight step-like construction, providing it with a V-shaped (with a pointed apex at its aft end) will also funnel water as it migrates aft so as to concentrate it centrally for efficient discharge at a single location.

And if any water climbs over the barrier 270, it encounters the plank 280. The plank 280 projects beyond the rest of the drainmast 200 and it has shape that aerodynamically encourages the airstream A to flow substantially evenly therearound. Thus, any water encountering the plank 280 is immediately escorted aft by the airstream traveling therearound. (FIG. 2L.)

As shown in FIGS. 2M-2P, the same series of fluid-steering events will occur with two exits 211 and 212.

The drainmast 200 can incorporate each of the above-discussed fluid-steering features as they tend to complement each other in progression. However, depending upon the drainmast design, less than all of these features can be employed. For example, as shown in FIGS. 2Q-2T, the step 260, the barrier 270, and the plank 280 can be used individually. And as shown in FIGS. 2U-2W, the step 260 can be used with the barrier 270 without the plank 280 (FIG. 2U), the step 260 can be used with the plank 280 without the barrier 270 (FIG. 2V), and/or the barrier 270 can be used with plank 280 without the step 260 (FIG. 2W).

Referring now to FIGS. 3A-3G, as was indicated above, the foot 300 defines the drainmast exits 211-212. In the illustrated embodiment, the foot 300 includes passages 311-312, the lower ends of which delineate the exits 211-212. And as is explained in more detail below, the foot 300 also incorporates the fluid-steering features 250, 260, 270, and 280 of the drainmast 200 (in the form of a deck 350, a pulpit 360, a bannister 370, and a lip 380, introduced below).

The foot 300 can comprise a ceiling 320 through which the passages 311 and 312 transverse. The topside of the ceiling 320 can host components adapted for fairing-connecting, heating, tube-holding and/or other purposes. For example, a fairing-connection tab 321 can be attached to the ceiling's fore edge, a heat-transfer island 322 can stand on an aft region, and a curved crest 323 can extend along its upper stern. Other components (such as the tube-holding pedestal 330 introduced below) can be connected or otherwise integrated into the foot ceiling 320.

The underside of the ceiling 320 forms a prelude deck 340 fore of the exits 211-212 and a finale deck 350 aft of the exits 211-212. A pulpit 360 is situated between the decks 340 and 350 and extends downward from ceiling 320. The passages 311 and 312 extend transversely through the pulpit 360 whereby the exits 211 and 212 are located on the pulpit's bottom face 361. At the fore end of the pulpit 360, a ramp 362 forms a gradual transition between its bottom face1 361 and the prelude deck 340. At the aft end of the pulpit 360, a wall 363 forms a sharp stepped transition between its bottom face 361 and the finale deck 350. If, for example, the pulpit's bottom face 361 is parallel with the decks 340 and 350, the wall 363 can extend perpendicularly therebetween A bannister 370 extends downward along an aft edge of the deck 350 and it can have a height approximately the same as that of the pulpit 360. The bannister 370 can span across the deck's aft edge in straight path, but a more funnel-like form may enhance the efficiency of this fluid-steering feature.

In the illustrated embodiment, for example, the bannister 370 includes side sections 371 which angle inward and meet at an aft apex section 372 making a V-shape. This and other funnel-like forms will focus water towards the deck center to prevent lateral migration away from the deck 350. And small water drips along the deck 350 will be collected and concentrated towards the apex section 372, for efficient shedding from the foot 300.

A converging lip 380 cantilevers outward from the aft edges of the finale deck 350 and thus extends beyond the crest 323 and the bannister 370. As is best seen by referring briefly back to FIGS. 2A-2B, the lip 380 also extends aft beyond the fairing 700. The lip 380 has shape causing the airstream A to flow substantially evenly therearound. For example, the lip 380 can have a duckbill shape with smooth upper and lower surfaces that taper towards each other and smooth lateral edges that converge towards each other in the fore-aft direction.

Rails 390 can extend downward from lateral edges of the ceiling 320 to form side fences around the post-exit deck 350. The rails 390 can also surround some or all of the prelude deck 340 and/or the pulpit 360. The rails' height can be slightly taller than that of the pulpit 360 and/or the bannister 370.

As was alluded to above, the illustrated foot 300 incorporates the fluid-steering features 250, 260, 270, and 280 of the drainmast 200. Specifically, the deck 350 creates the post-exit stage 250, the pulpit 360 causes the exit-stage vertical offset, the pulpit's rear wall 363 forms the spray-producing step 260, the bannister 370 builds the water-kicking barrier 270, and the lip 380 produces the water-escorting plank 290. The rails 390 can function as the optional rails 290 of the drainmast 200.

The foot 300 can be made any suitable metal (e.g., aluminum, stainless steel, titanium, alloys thereof), although copper and copper alloys may be preferred because of their heat-conducting and/or wear-enduring characteristics. The foot 300 can be formed in one piece by an appropriate manufacturing technique (e.g., casting and machining). That being said, non-metal foot materials (e.g., fiber-reinforced plastic) and/or plural-piece foot constructions are possible and contemplated.

The incorporation of efficient and effective fluid-steering features into the drainmast 200 allows a foot construction with smaller size, lighter weight, lower heating-power requirements, and/or decreased drag. For example, as is best seen by referring briefly back to FIG. 2A-2C and 2H, the foot 300 does not span the entire length (i.e., fore-to-aft dimension) of the drainmast 200, but instead only occupies non-fore regions.

The fore region of the drainmast underside 220 is formed by the fairing 700 (and particularly a bottom nose panel 731 introduced below). In the mid region of the drainmast 200, only the very thin side edges of the prelude deck 340 and the walls of the pulpit 360 are laterally exposed. In the aft region of the drainmast, exterior surfaces of the crest 232 and bannister 370 are unsheltered by the fairing 700. The lip 380 also extends beyond the fairing 700, as this may be necessary to its water-escorting purpose.

Side rails 290/390 may still be necessary in many drainmast designs to prevent heavy discharge plumes from wrapping around the foot 300 and contacting the fairing 700. However, the rails 290/390 may be made shorter in length (i.e., fore-aft dimension) and/or shorter in height (i.e., the up-down dimension).

Referring now to FIGS. 3H-3K, a pedestal 330 can be attached to the foot 300. The pedestal 330 can comprise a stand 331 and a heat-transfer block 332 attached to the stand 331. In the illustrated pedestal 330, the stand 331 is mounted on the foot's ceiling 320 just fore of the passage 321 and extends upward therefrom at a tilt in the fore direction. The stand's fore side 333 can be flat and the heat-transfer block 332 can be appended thereto. The aft side 334 of the stand 300 can be curved to cradle the draintube 400.

The pedestal 330 can be made of the same or different material as the foot 300, but preferably has strong heat-conducting characteristics. The stand 331 can be attached to the foot 300 by welding, brazing, or other suitable attachment technique. A pedestal 330 formed in one piece with the foot 300 (or a part of a multi-piece foot) is further feasible and foreseeable.

As shown in FIGS. 4A-4F, the draintube 400 has an inlet adapter 401 at its top end which defines the the drainmast's entrance 201. The draintube's outlet 411 extends through the fore passage 311 in the foot 300 and communicates with the drainmast exit 211. The draintube 400 can lean tightly against the pedestal 330, as the stand's aft side 334 conforms to its curved contour.

As shown in FIGS. 5A-5F, the draintube 500 has an inlet adapter 502 at its top end which defines the drainmast entrance 202. The outlet 512 of the draintube 500 extends through the fore foot passage 312 whereby it communicates with the drainmast exit 212. A posing bracket 530, with a circular aperture 531, can be attached to the draintube 500 and project outwardly therefrom in the aft direction.

As shown in FIGS. 5G-5L, when both the draintube 400 and the draintube 500 are mounted on the foot 300, the drainmast entrance 201 communicates with the drainmast exit 211 and the drainmast entrance 202 communicates with the drainmast exit 212. The inlet adapter 401 of the fore draintube 400 is attached to an aircraft drain line (e.g., a potable water drain line) and the inlet adapter 502 of the aft draintube 500 is attached to another aircraft drain line (e.g., a gray water drain line). And as is best seen by referring briefly back to FIGS. 2A-2B, the adaptors 401 and 502 project above the fairing 700 so that they may extend into the aircraft fuselage for connection to the appropriate drain lines.

The draintubes 400 and 500 can be made of the same or different materials. But again, certain metals (e.g., aluminum, stainless steel, copper, titanium, alloys thereof) may be preferred because of their heat-conducting and/or wear-enduring attributes. They can be fixed to the foot 300 by welding, brazing, or any other appropriate affixing procedure. Draintubes 400/500 formed individually in one piece, in one piece with each other, in one piece with the pedestal 330, in one piece with the bracket 530, and/or in one piece with the foot 300 are achievable and acceptable.

The bracket 530 can be made of any suitable material and joined to the draintube 500 in any suitable manner. However, because the bracket 530 is primarily a posing part, high heat-conducting characteristics may not be necessary and could even be undesirable. Instead, a material encouraging heat to remain with the draintube 500 may be more advantageous.

As shown in FIGS. 6A-6F, the heater 600 comprises a supply connector 610, a return connector 620, and a conduit 630 extending therebetween. The conduit 630 contains a resistantance-type heating element which is often best known under the General Electric tradename Calrod™. While other types of heaters may be used, a conduit-type heater can include continuous sections which are bent, wrapped, coiled, or otherwise shaped to closely conform with the to-be-heated components. The illustrated conduit 630 includes, for example, sections 631-637.

Figure 6A:
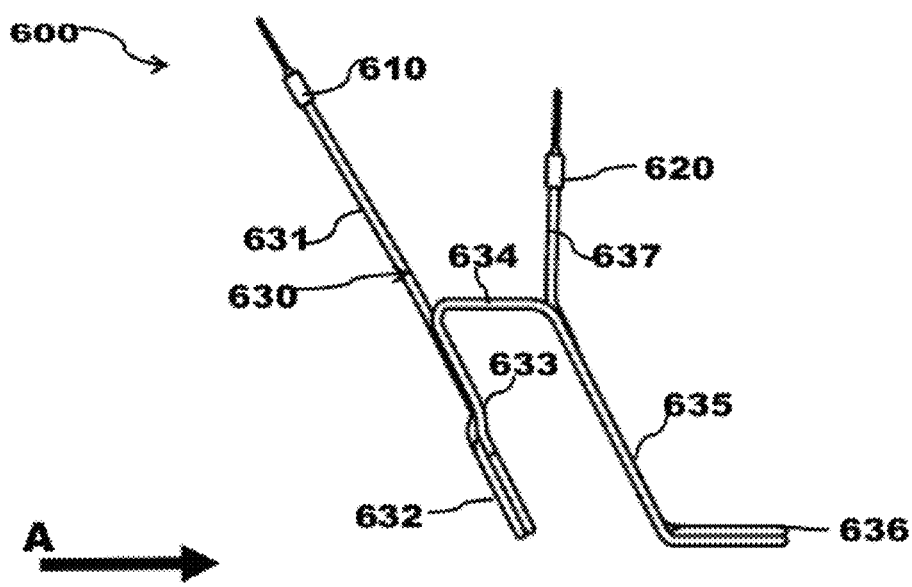
Figure 6B:
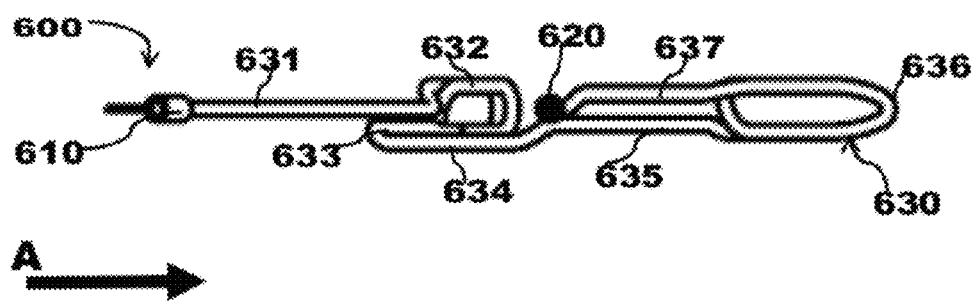
Figure 6C:
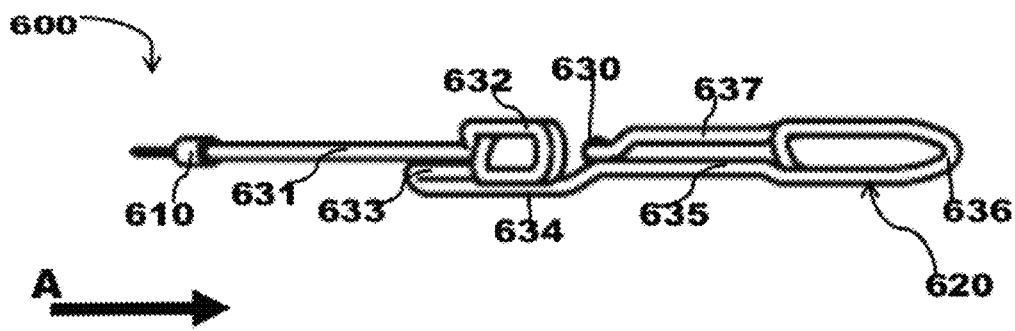
Figure 6F:
Figure 6F:
Figure 6F:
Figure 6G:
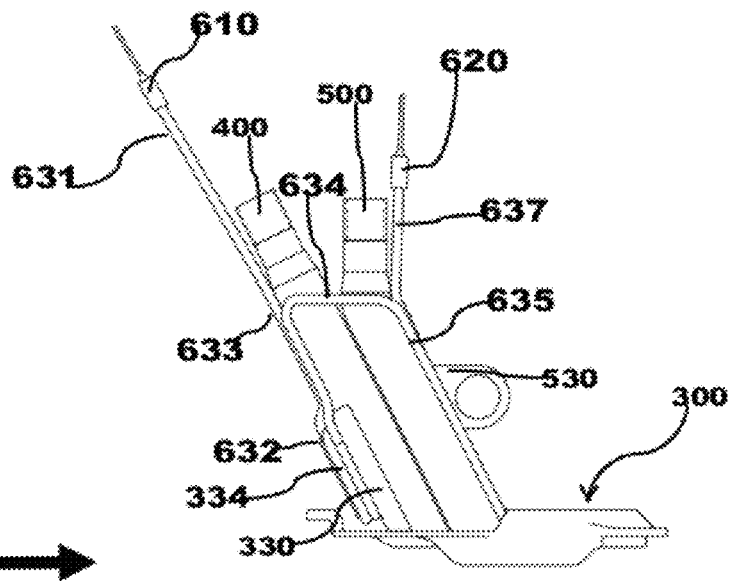
Figure 6H:
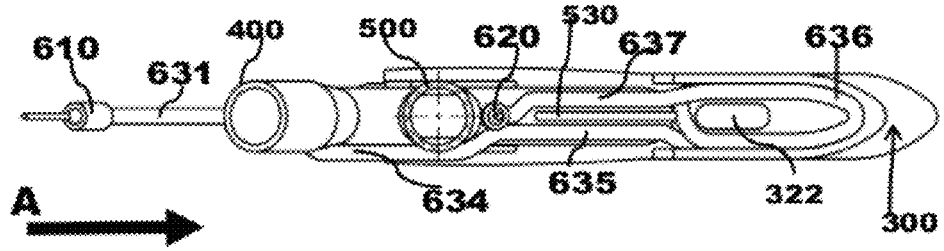
Figure 6I:
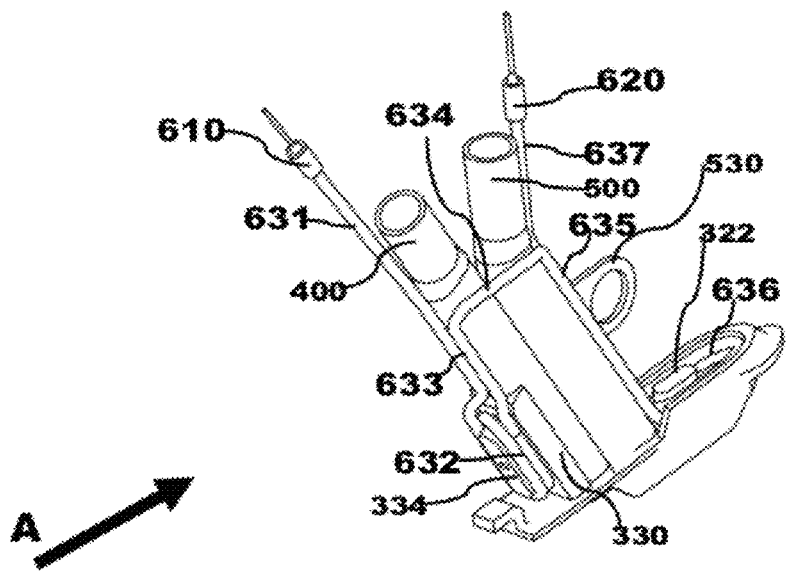

As is shown in FIGS. 6G-6I, section 631 extends down from the supply connector 610 to the pedestal 330. Section 632 wraps around the heat-transfer block 332 of the pedestal 330. Section 633 extends upward from the pedestal 330 along the fore draintube 400. Section 634 bridges across the draintubes 400 and 500. Section 635 extends downward along the aft draintube 500 to the foot 300 along one side of the posing bracket 530. Section 636 coils around the island 332 in the foot 300. And section 637 extends up from the foot 300 to the return connector 620 along the other side of the posing bracket 530.

The connectors 610 and 620 are electrically connected to a power source onboard the aircraft 100 to thereby form an electrical path through the heating element in the conduit 630. As is best seen by referring briefly back to FIGS. 2A-2B, the connectors 610 and 620, and the sections 631 and 637, project above the fairing 700 so that they may extend into the aircraft fuselage for connection to onboard electrical lines.

As was indicated above, the fluid-steering features of the drainmast 200 allows for reduced heating-power requirements. As such, a separate heater for the foot 300 is not necessary. The pedestal's block 332 (which heater section 632 is wrapped around) and the foot's island 322 (which heater section 636 is coiled around) serve as heat sinks and sufficiently transfer heat to the otherwise ice-prone areas of the foot 300.

It may be further noted that, except for the tube-briding section 634, heater sections do not reside on lateral surfaces of the draintubes 400 and 500. Specifically, for example, the section 631 and section 633 extend along the fore surface of the draintube 400 and section 635 and 637 extend along the aft surface of the draintube 500. And is best seen by referring briefly back to FIGS. 2A-2B, the tube-briding section 634 is situated above the fairing 700. As such, the heater 600 does not widen the fairing-encircled span of the drainmast 200. This contributes to a thinner profile, resulting in lower weight and decreased drag.

Figure 7A:
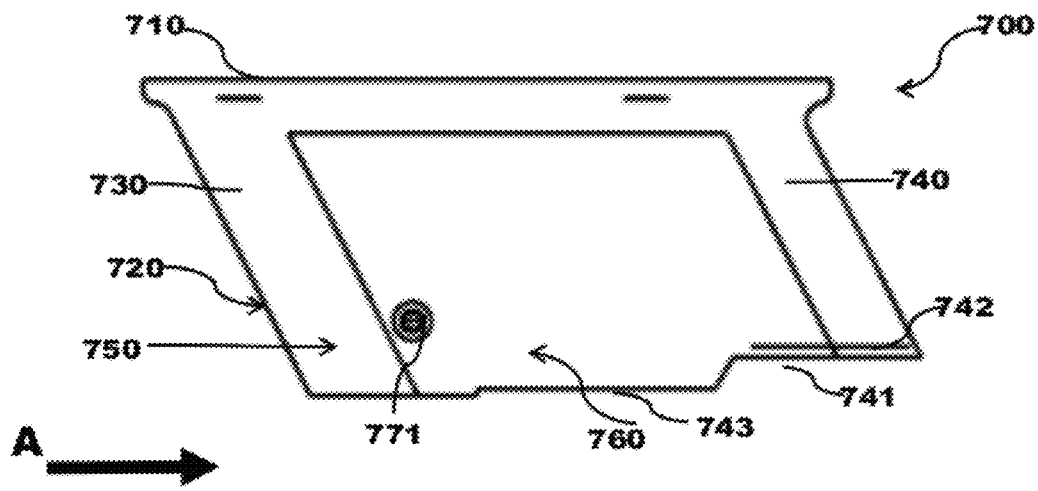
FIGS. 7A-7Q show various views of a fairing 700 and parts thereof.
Figure 7B:
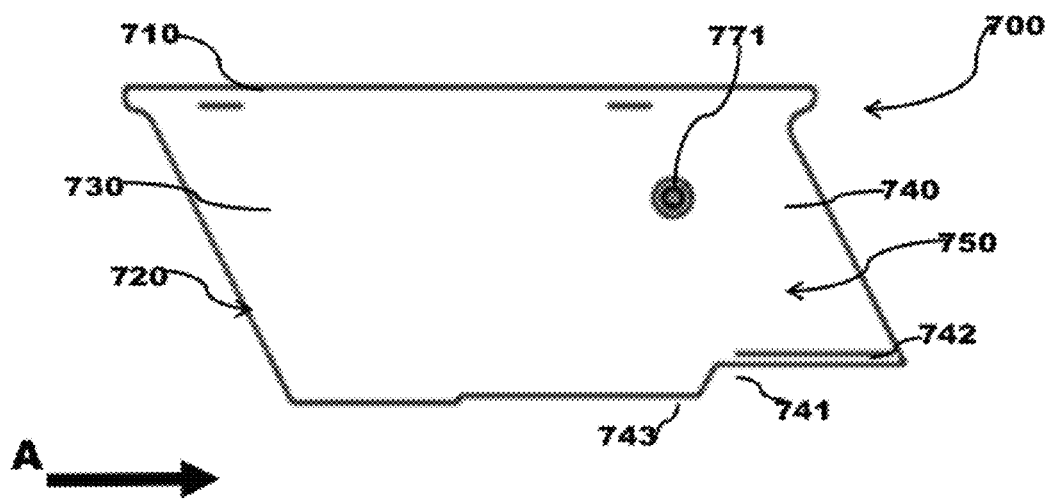
Figure 7G:
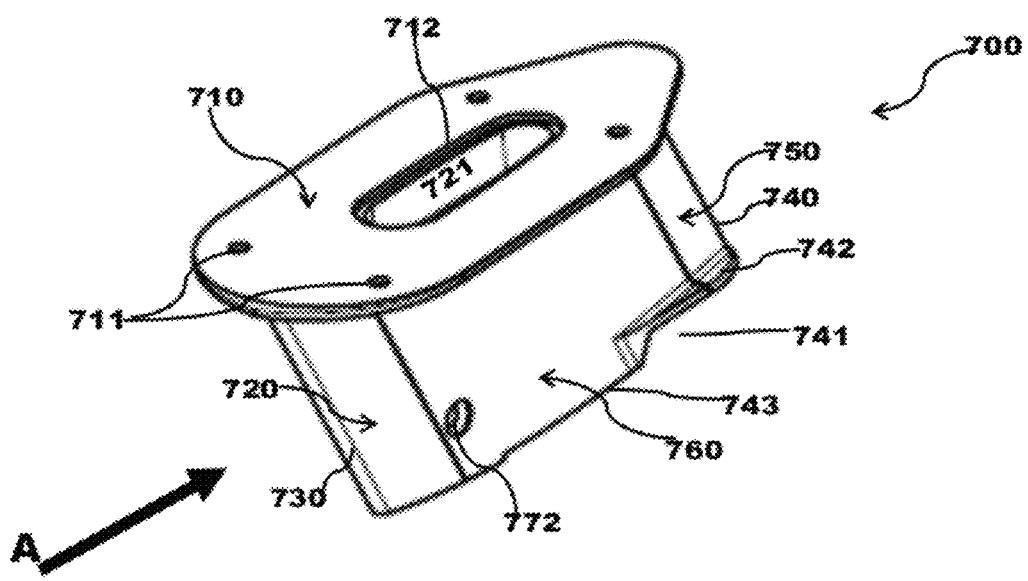
Figure 7H:
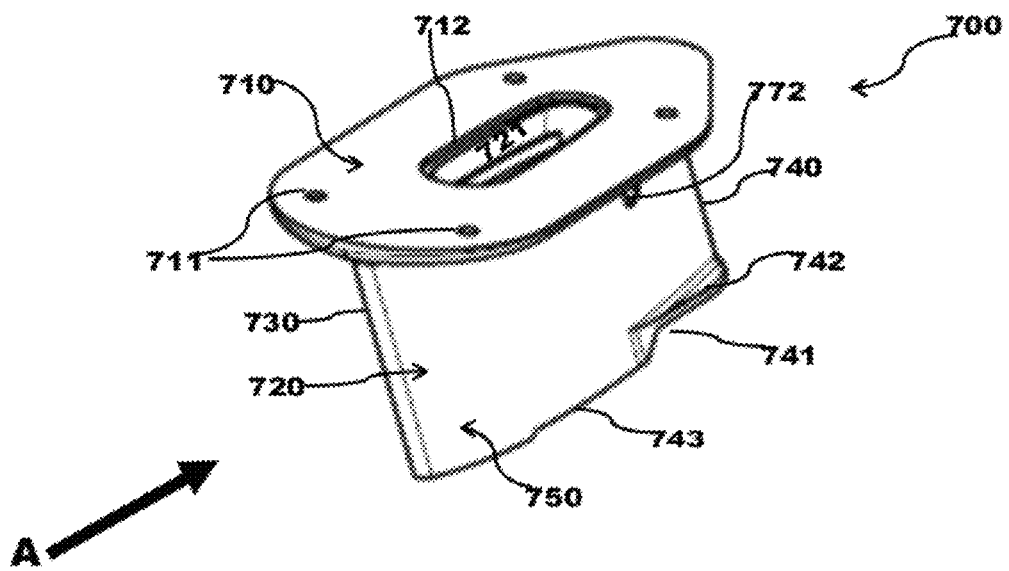
Figure 7I:
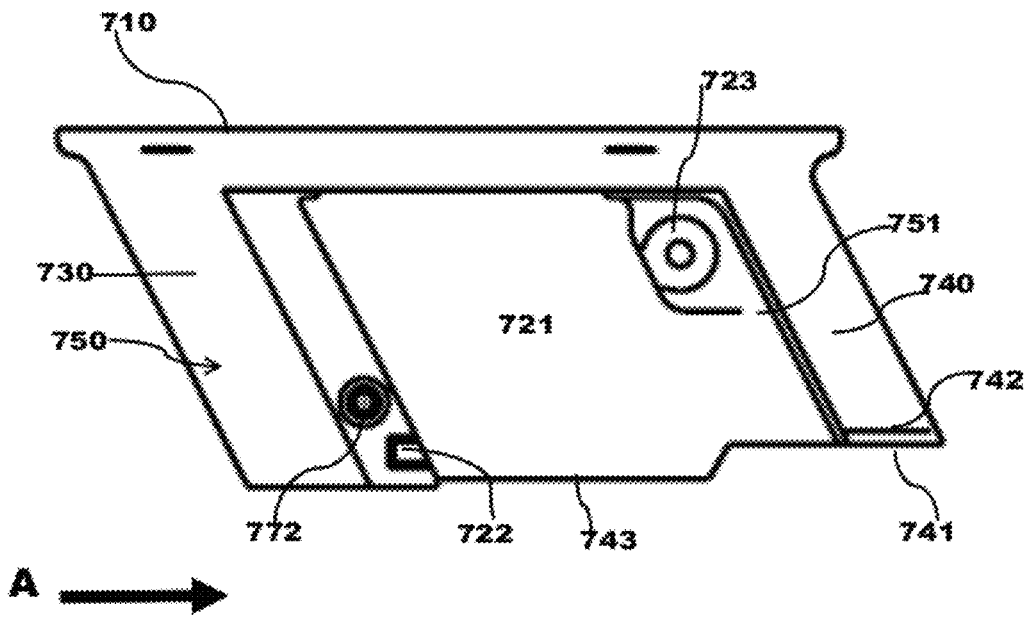
Figure 7J:
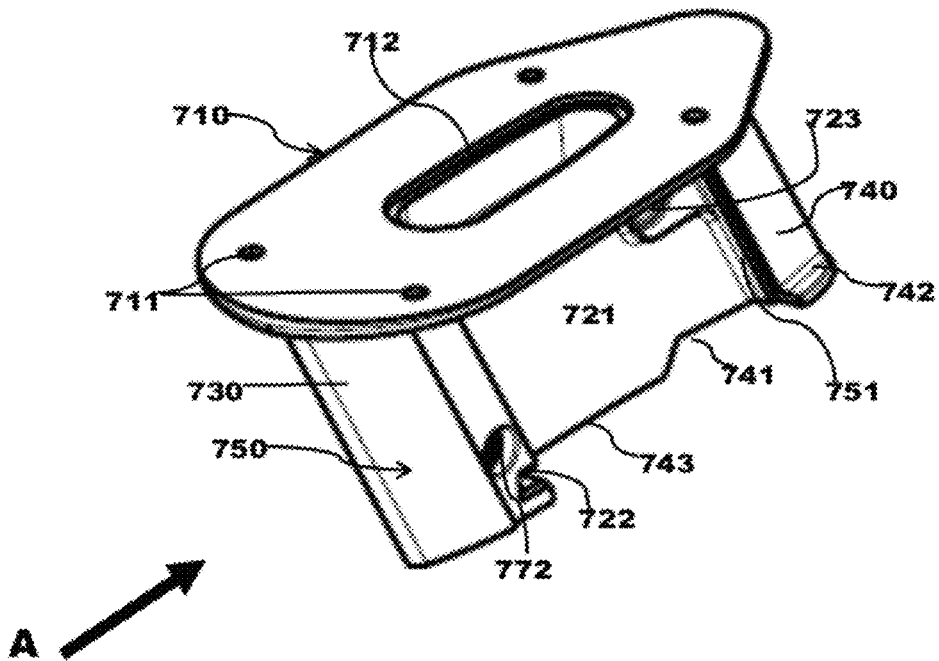
Figure 7Q:
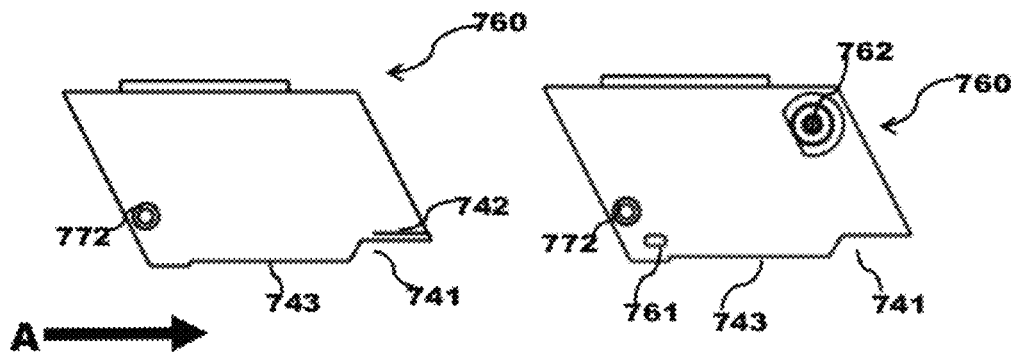
Figure 7Q:
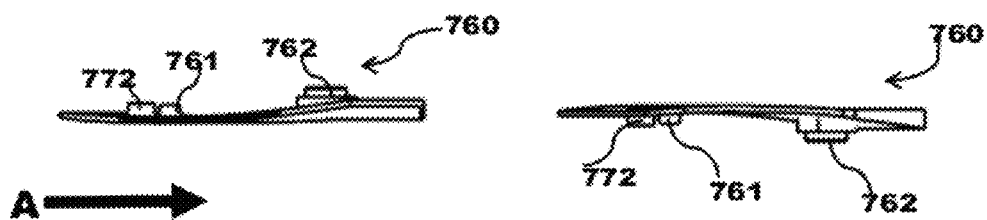
Figure 7Q:
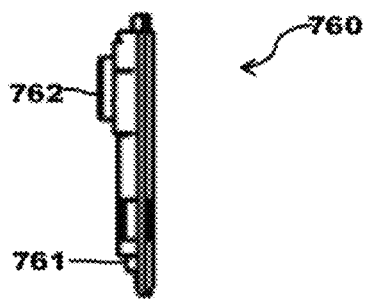
Figure 7Q:
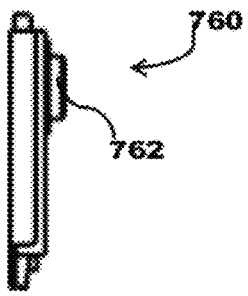
Figure 7Q:
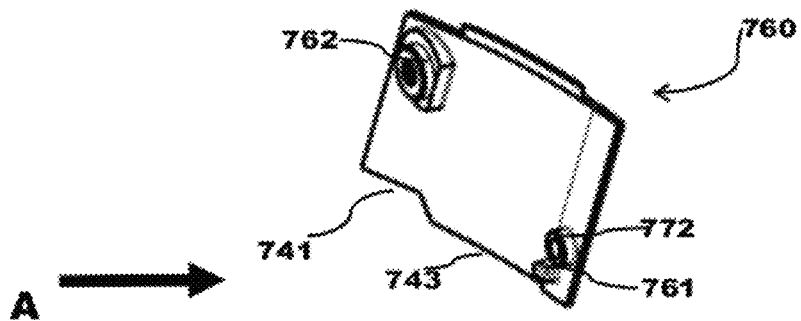

Referring now to FIGS. 7A-7Q, the fairing 700 comprises a mounting flange 710 and a mast 720. The flange 710 can include openings 711 for fastener receipt when mounting the fairing 700 to the aircraft 100. A central slot 712 can be provided in the flange 710 for the draintube adapters 401/502 and the heater connectors 610/620 to extend therethrough.

The mast 720 extends downward from the flange 710 and forms a hollow 721 encircling the rest of the draintubes 400/500 and the heater 600. Posing components can be strategically situated within the hollow 721 for properly positioning of the foot 300, the draintubes 400/500, and the heater 600 relative to each other and/or the fairing 700. Specifically, for example, a slot 722 and/or a knob 723 can be posed within the fairing hollow 721.

The fore region of the mast 720 forms its nose 730 and a rear region forms its tail 740. A bottom panel 731 spans the nose 730 to form a fore region of the drainmast underside 220. And as is best seen by referring briefly back to FIGS. 2D and 2H, the remainder of the drainmast underside 220 is formed by the foot 300.

The tail 740 includes a foot-accommodating profile, with cutouts 741, an awning 742, and a thin groove 743. The cutouts 741 fit over the foot's crest 323 and the awnings 742 canopy over the crest 323. The groove 743 receives fore and mid regions of the floor 320.

The illustrated mast 720 comprises a main body 750 and a door 760. The main body 750 has a window 751 which is situated on either its port or starboard side and which looks into the hollow 721. In the illustrated fairing 700, the window 751 has an open edge extending along the bottom of the body 750. The door 760 closes the window 751 and sits flush with the main body 750. Fasteners 770, received in apertures 771, are used to secure the door 760 to the main body 750.

On the windowless side of the mast 720, the main body 750 forms the cutout 741, the awning 742, and the groove 743. On the windowed side of the mast 720, the cutout 741 and the awning 742 are formed together by main body 750 and the door 760, and the door 760 forms the groove 743.

The door 760 can also include posing components on its inner surface. For example, the illustrated stub 761 works with the slot 722 to properly position the tab 321 of the foot 300 relative to the fairing 700. And the illustrated knob 762 coordinates with the knob 723 on the main body 750 to sandwich the draintube bracket 530 therebetween.

The fairing 700, the main body 750, and/or the door 760, are constructed from a fitting medium, such one containing plastic, metal, and/or fiberglass. For example, they can be made from a fiber reinforced plastic by compression molding, resin transfer molding, and/or filament winding. Preferably, the main body 750 and the door 760 are each made in one piece.

With a one-piece fairing, there is no seam line between parts and thus no inherent weakness tempting mechanical failure. However, it is difficult to inspect interior components of the drainmast assembly after they are inserted into the hollow of a one-piece fairing. A two-piece fairing provides the advantage of after-insertion inspection, but this has traditionally come at the price of a seam line on the mounting flange. The doored design of the fairing 700 allows inspection of the interior components during assembly, without the compromising of a one-piece fairing 710.

One may now appreciate that a drainmast design is provided with water-steering features that effectively and efficiently discharge water into the airstream. While the aircraft 100, the drainmast 200, the foot 300, the draintube 400, the draintube 500, the heater 600, and/or the fairing 700 have been shown and described with respect to a certain embodiment or embodiments, other equivalent alterations and modifications will occur to others skilled in the art upon the reading and understanding of this disclosure.

The invention claimed is:

1. A drainmast which releases water into an airstream traveling in a fore-aft direction, comprising:
   a water-discharging exit on its underside for communicating with the airstream;
   a post-exit stage on its underside situated aft of the water-discharging exit; and
   a fairing having a mounting flange and a mast projecting downward from the mounting flange, the mast including a main body with a window and a door fastened to the main body to close the window;
   wherein the water-discharging exit is vertically offset downward from the post-exit stage.

2. A drainmast as set forth in claim 1, comprising a water-spraying wall situated between the water-discharging exit and the post-exit stage.

3. A drainmast as set forth in claim 1, comprising a water-kicking barrier extending downward from an aft end of the post-exit stage.

4. A drainmast as set forth in claim 1, comprising a water-escorting plank cantilevered from an aft end of the post-exit stage.

5. A drainmast as set forth in claim 1, comprising rails extending downward from lateral edges of the post-exit stage.

6. A drainmast as set forth in claim 1, comprising two water-discharging exits and wherein the post-exit stage is situated aft of both exits.

7. A drainmast as set forth in claim 6, wherein one water-discharging exit is a fore exit and the other water-discharging exit is an aft exit located aft of the fore exit.

8. A drainmast as set forth in claim 5, wherein the underside is formed at least partially by a foot.

9. A drainmast as set forth in claim 1, wherein the underside is formed only partially by the foot.

10. A drainmast as set forth in claim 1, comprising a foot which includes:
    a deck forming the post-exit stage;
    a pulpit located fore of the deck and having a bottom face on which the water-discharging exit is situated;
    a wall extending between the deck and the pulpit's bottom face to form a water-spraying step;
    a banister extending downward from an aft end of the deck to form a water-kicking barrier; and
    a lip cantilevered from an aft end of the deck to form a water-escorting plank.

11. A drainmast as set forth in claim 10, wherein the banister includes side sections which funnel towards each other.

12. A drainmast as set forth in claim 10, wherein the lip has a duckbill shape causing the airstream to flow substantially evenly therearound.

13. A drainmast as set forth in claim 10, comprising rails which extend downward from lateral edges of the deck.

14. A drainmast as set forth in claim 1, comprising a heater adapted to heat a heat sink to transfer heat to a region of the underside.

15. A drainmast as set forth in claim 1, comprising a heater including a supply connector, a return connector, and a conduit forming an electrical path between the connectors; wherein the conduit includes:
    tube-heating sections which do not widen the drainmast span;
    at least one sink-heating section that wraps around a heat sink; and
    a tube-bridging section that is elevated relative the other sections.

16. A drainmast as set forth in claim 1, wherein the mast comprises a hollow within the mast for housing interior drainmast components.

17. A drainmast as set forth in claim 16, wherein the fairing comprises a bottom panel forming a fore region of the underside.

18. An aircraft comprising the drainmast set forth in claim 1 mounted to its fuselage, wherein an aircraft water line communicates with the drainmast's water-discharging exit.

* * * * *